US009720708B2

(12) United States Patent
Caspole

(10) Patent No.: US 9,720,708 B2
(45) Date of Patent: Aug. 1, 2017

(54) DATA LAYOUT TRANSFORMATION FOR WORKLOAD DISTRIBUTION

(75) Inventor: Eric R. Caspole, Bedford, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 63 days.

(21) Appl. No.: 13/214,083

(22) Filed: Aug. 19, 2011

(65) Prior Publication Data
US 2013/0047155 A1 Feb. 21, 2013

(51) Int. Cl.
G06F 9/44 (2006.01)
G06F 9/45 (2006.01)
G06F 9/445 (2006.01)
G06F 9/50 (2006.01)

(52) U.S. Cl.
CPC ............ G06F 9/445 (2013.01); G06F 9/5055 (2013.01); G06F 2209/509 (2013.01)

(58) Field of Classification Search
None
See application file for complete search history.

(56) References Cited

U.S. PATENT DOCUMENTS

| 6,289,506 | B1 |   | 9/2001  | Kwong et al. |           |
|-----------|----|---|---------|--------------|-----------|
| 6,631,515 | B1 |   | 10/2003 | Berstis      |           |
| 6,694,506 | B1 |   | 2/2004  | LeBlanc et al. |         |
| 6,789,253 | B1 |   | 9/2004  | Streich et al. |         |
| 7,849,452 | B2 | * | 12/2010 | Holt ............................. | 717/159 |
| 8,387,033 | B2 | * | 2/2013  | Gordy ..................... | G06F 8/456 |
|           |    |   |         |              | 717/149 |
| 2003/0204838 | A1 |   | 10/2003 | Caspole et al. |         |
| 2004/0139424 | A1 |   | 7/2004  | Mourachov    |           |
| 2005/0188364 | A1 | * | 8/2005  | Cockx ..................... | G06F 8/456 |
|           |    |   |         |              | 717/159 |
| 2007/0174819 | A1 | * | 7/2007  | Li .......................... | G06F 8/443 |
|           |    |   |         |              | 717/136 |
| 2007/0226698 | A1 | * | 9/2007  | Cascaval et al. ............ | 717/127 |
| 2007/0234276 | A1 | * | 10/2007 | Ottoni et al. ................. | 717/104 |
| 2008/0022264 | A1 | * | 1/2008  | Macklem et al. ............ | 717/136 |

(Continued)

OTHER PUBLICATIONS

Calvert, Peter, Parallelisation of Java for Graphics Processors, May 11, 2010, University of Cambridge, pp. 1, 40, and 84-86.*

(Continued)

*Primary Examiner* — Lewis A Bullock, Jr.
*Assistant Examiner* — Melissa Alfred
(74) *Attorney, Agent, or Firm* — Meyertons, Hood, Kivlin, Kowert & Goetzel, P.C.

(57) ABSTRACT

Techniques are disclosed relating to data transformation for distributing workloads between processors or cores within a processor. In various embodiments, a first processing element receives a set of bytecode. The set of bytecode specifies a set of tasks and a first data structure that specifies data to be operated on during performance of the set of tasks. The first data structure is stored non-contiguously in memory of the computer system. In response to determining to offload the set of tasks to a second processing element of the computer system, the first processing element generates a second data structure that specifies the data. The second data structure is stored contiguously in memory of the computer system. The first processing element provides the second data structure to the second processing element for performance of the set of tasks.

17 Claims, 13 Drawing Sheets

(56) References Cited

U.S. PATENT DOCUMENTS

| | | | |
|---|---|---|---|
| 2008/0263075 A1* | 10/2008 | Talja | G06F 9/45508 |
| 2009/0044179 A1* | 2/2009 | Luszczek et al. | 717/149 |
| 2009/0132867 A1* | 5/2009 | Stefansson et al. | 714/49 |
| 2009/0300636 A1 | 12/2009 | Ringseth et al. | |
| 2010/0082930 A1 | 4/2010 | Jiva et al. | |
| 2010/0115502 A1 | 5/2010 | Jiva et al. | |
| 2010/0122242 A1* | 5/2010 | Jiva | 717/148 |
| 2010/0199268 A1 | 8/2010 | Frost | |
| 2010/0306514 A1 | 12/2010 | Frost | |
| 2011/0004866 A1 | 1/2011 | Frost | |
| 2011/0067013 A1 | 3/2011 | Frost | |

OTHER PUBLICATIONS

Calvert, Peter, Parallelisation of Java for Graphics Processors, Univerity of Cambridge, May 2010, pp. 1, 40, and 84-86.*

N. Wirth, Algorithms and Data Structures, Aug. 2004, ETH Zurich, Oberon Version, p. 20.*

Calvert, Parallelisation of Java for Graphics Processors, May 11, 2010, University of Cambridge.*

Cristina Cifuentes, "A Structuring Algorithm for Decompilation," Proceedings of the XIX Conferencia Latinoamericana de Informatica, Aug. 1993, Buenos Aires, 10 pages.

Rob Meadows, "Decompilation of Binary Programs by Cristina Cifuentes and John Gough," date unavailable, 6 pages.

International Search Report and Written Opinion in Application No. PCT/US2011/037029 dated Aug. 23, 2011, 14 pages.

Peter Calvert, "Parallelisation of Java for Graphics Processors," Computer Science Tripos, Part II, Trinity College, XP002651463, May 11, 2010, pp. 1-91.

Aart J.C. Bik and Dennis B. Gannon, "javab—a prototype bytecode parallelization tool," Technical Report TR489, Computer Science Department, Indiana University, XP002651464, Jul. 1997, pp. 1-52.

Georg Dotzler, Ronald Veldema, Michael Klemm, "JCudaMP: OpenMP/Java on CUDA," Proceedings of the 3rd International Workshop on Multicore Software Engineering, XP55003114, Jan. 1, 2010, pp. 10-17.

Yonghong Yan, Max Grossman, and Vivek Sarkar, "JCUDA: A Programmer-Friendly Interface for Accelerating Java Programs with CUDA," Euro-Par 2009 Parallel Processing, XP019127296, Aug. 25, 2009, pp. 887-899.

Alan Leung, et al., "Automatic Parallelization for Graphics Processing Units," Proceedings of the 7th International Conference on Principles and Practice of Programming in Java (PPPJ '09), ACM, Aug. 27-28, 2009, pp. 91-100.

* cited by examiner

DATA LAYOUT TRANSFORMATION FOR WORKLOAD DISTRIBUTION

BACKGROUND

Technical Field

This disclosure relates generally to processors, and, more specifically, to distributing workloads between processors or cores within a processor.

Description of the Related Art

To improve computational performance, processors may implement a variety of techniques to perform tasks concurrently. A modern processor may be pipelined and/or multi-threaded, include multiple cores, and be one of several processors included with a single computer system. Some processors are also specialized for various tasks, such as graphics processors, digital signal processors (DSPs), etc. In order to encourage usage of these various capabilities, several "domain-specific" languages have been developed to facilitate the distribution of workloads among all of these different, heterogeneous resources. Examples of such languages include OPENCL, CUDA, and DIRECT COMPUTE.

Application developers can be discouraged from using domain-specific languages because these languages use a different programming paradigm than heavily adopted object-oriented programming (OOP) languages such as PYTHON, RUBY, JAVA, C++, C#, etc. Domain-specific languages typically use a data-parallel paradigm, in which software is developed around the creation of sets of executable code (e.g., called "kernels" in OPENCL) that can operate on large quantities of data in a parallel. OOP, on the other hand, uses a paradigm, in which software is developed around "objects," which are units of associated data and methods to manipulate that data. In many instances, the data-parallel paradigm supported by domain-specific languages can be somewhat contrary to the object-oriented paradigm.

SUMMARY OF EMBODIMENTS

The present disclosure describes techniques relating to data transformation for distributing workloads between processors or cores within a processor.

In one embodiment, a computer readable medium having program instructions stored thereon is disclosed. The program instructions are executable on a first processing element of a computer system to perform receiving a set of bytecode. The set of bytecode specifies a set of tasks and a first data structure that specifies data to be operated on during performance of the set of tasks. The first data structure is stored non-contiguously in memory of the computer system. The program instructions are further executable to perform, in response to determining to offload the set of tasks to a second processing element of the computer system, generating a second data structure that specifies the data. The second data structure is stored contiguously in memory of the computer system. The program instructions are further executable to perform causing the second data structure to be provided to the second processing element for performance of the set of tasks.

In another embodiment, a method is disclosed. The method includes a first processing element receiving a set of instructions specifying a data parallel problem and a set of data values to be operated on during performance of the data parallel problem. The set of data values is stored non-contiguously in a memory of a computer system. The method further includes, in response to determining to offload the data parallel problem to a second processing element, the first processing rearranging the set of data values so that the set of data values are stored contiguously in the memory. The method further includes the first processing element providing the rearranged data values to the second processing element for performance of the data parallel problem.

In still another embodiment, a computer readable medium is disclosed. The medium includes source program instructions of a library routine that are compilable by a compiler for inclusion in compiled code as a compiled library routine. The compiled library routine is executable on a first processing element of a computer system to perform receiving a first set of bytecode. The first set of bytecode specifies a set of tasks and a first data structure that specifies data to be operated on during performance of the set of tasks. The first data structure is stored non-contiguously in memory of the computer system. The compiled library routine is further executable to perform, in response to determining to offload the set of tasks to a second processing element of the computer system, generating a second data structure that specifies the data. The second data structure is stored contiguously in memory of the computer system. The compiled library routine is further executable to perform causing the second data structure to be provided to the second processing element for performance of the set of tasks.

DETAILED DESCRIPTION

Figure 1:
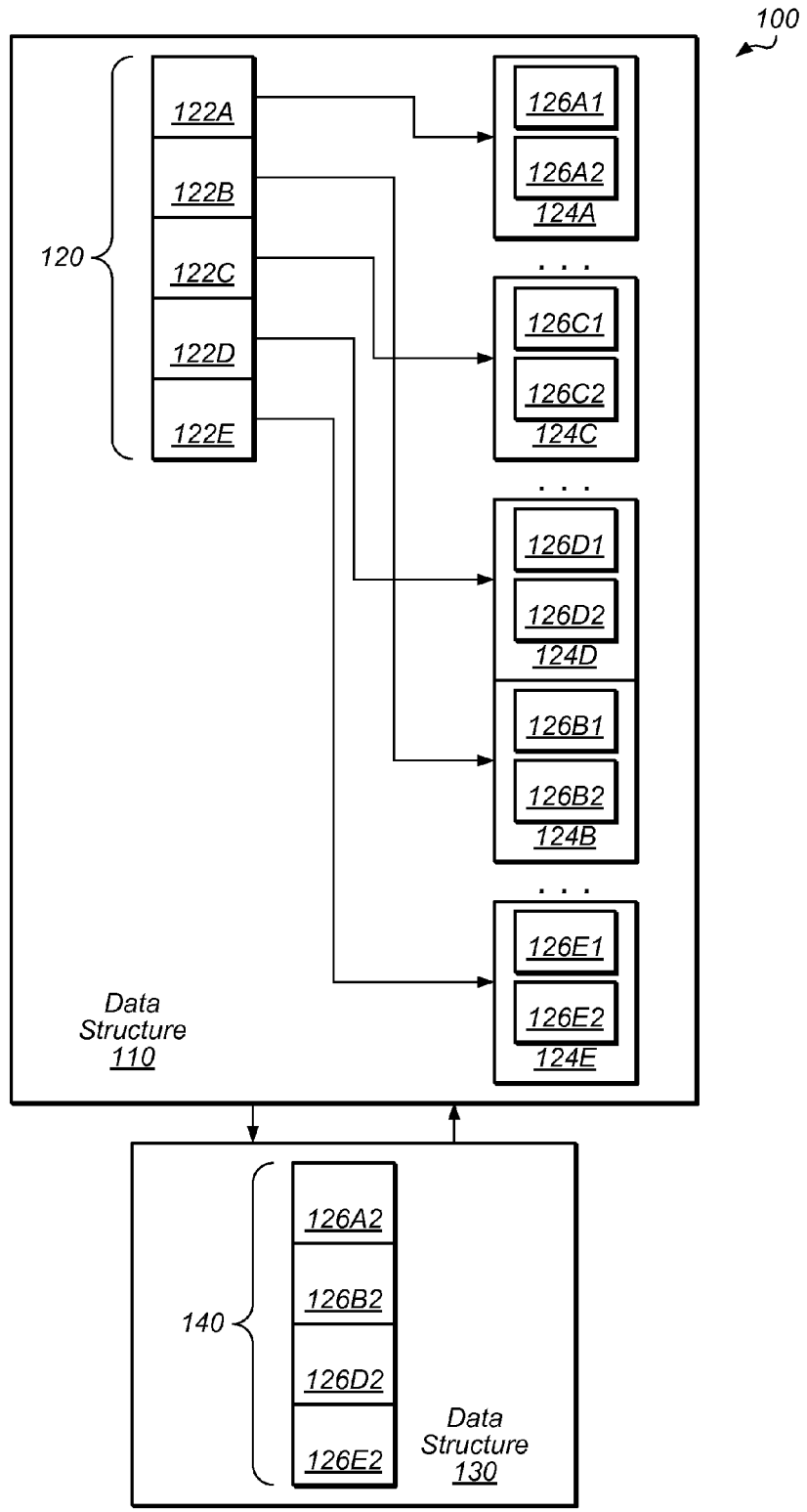
FIG. 1 is a block diagram illustrating a memory storing two exemplary data structures.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a processor having eight processing cores, the terms "first" and "second" processing cores can be used to refer to any two of the eight processing cores. In other words, the "first" and "second" processing cores are not limited to logical processing cores 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Processor." This term has its ordinary and accepted meaning in the art, and includes a device that is capable of executing instructions. A processor may refer, without limitation, to a central processing unit (CPU), a co-processor, an arithmetic processing unit, a graphics processing unit, a digital signal processor (DSP), etc. A processor may be a superscalar processor with a single or multiple pipelines. A processor may include a single or multiple cores that are each configured to execute instructions. The term "processing element" is used herein to refer, more generally, to an apparatus configured to execute instructions.

"Executable." As used herein, this term refers not only to instructions that are in a format associated with a particular processor (e.g., in a file format that is executable for the instruction set architecture (ISA) of that processor, or is executable in a memory sequence converted from a file, where the conversion is from one platform to another without writing the file to the other platform), but also to instructions that are in an intermediate (i.e., non-source code) format that can be interpreted by a control program (e.g., the JAVA virtual machine) to produce instructions for the ISA of that processor. Thus, the term "executable" encompasses the term "interpretable" as used herein. When a processor is referred to as "executing" or "running" a program or instructions, however, this term is used to mean actually effectuating operation of a set of instructions within the ISA of the processor to generate any relevant result (e.g., issuing, decoding, performing, and completing the set of instructions—the term is not limited, for example, to an "execute" stage of a pipeline of the processor).

"Heterogeneous Computing Platform." This term has its ordinary and accepted meaning in the art, and includes a system that includes different types of computation units such as a general-purpose processor (GPP), a special-purpose processor (i.e. digital signal processor (DSP) or graphics processing unit (GPU)), a coprocessor, or custom acceleration logic (application-specific integrated circuit (ASIC), field-programmable gate array (FPGA), etc.

"Bytecode." As used herein, this term refers broadly to a machine-readable representation of compiled source code. In some instances, bytecode may be executable by a processor without any modification. In other instances, bytecode maybe processed by a control program such as an interpreter (e.g., JAVA virtual machine, PYTHON interpreter, etc.) to produce executable instructions for a processor. As used herein, an "interpreter" may also refer to a program that, while not actually converting any code to the underlying platform, coordinates the dispatch of prewritten functions, each of which equates to a single bytecode instruction.

"Virtual Machine." This term has its ordinary and accepted meaning in the art, and includes a software implementation of a physical computer system, where the virtual machine is executable to receive and execute instructions for that physical computer system.

"Domain-Specific Language." This term has its ordinary and accepted meaning in the art, and includes a special-purpose programming language designed for a particular application. In contrast, a "general-purpose programming language" is a programming language that is designed for use in a variety of applications. Examples of domain-specific languages include SQL, VERILOG, OPENCL, etc. Examples of general-purpose programming languages include C, JAVA, BASIC, PYTHON, etc.

"Application Programming Interface (API)." This term has its ordinary and accepted meaning in the art, and includes an interface that enables software to interact with other software. A program may make an API call to use functionality of an application, library routine, operating system, etc.

"Data structure." This term has its ordinary and accepting meaning in the art, and includes a collection of data stored in memory and the arrangement (i.e., layout) of the data. From a conceptual standpoint, a data structure may be viewed as a container (referred to as field) and its one or more contents. These contents may include data values and/or one or more additional containers, which, in turn, include one or more contents. A field may store primitive datatypes such as a boolean, character, string, integer, floating-point value, etc. A field may also store more complicated datatypes constructed from multiple primitive datatypes and/or pointers—e.g., linked lists, queues, stacks, trees, etc.

"Contiguous." As used herein, this term refers to data or a data structure that is stored within a single block of adjacent memory locations. An array of integers is one example of a data structure that is typically stored contiguously in memory. In contrast, noncontiguous refers to data or a data structure stored within multiple blocks of non-adjacent memory locations. A linked list is one example of a data structure that is typically stored non-contiguously. Data or a data structure may also be described as being stored contiguously if it is stored within a single block of a virtual address space even though it may be stored among multiple blocks in a physical address space.

Introduction

The reliance on objects in OOP has given rise to the usage of more complex data structures, which may rely heavily on the usage of non-primitive datatypes and pointers. As will be described in conjunction with FIG. 1, usage of more complex structures is less conducive to parallelization (i.e., data-parallel execution) than simpler data structures typically used with domain-specific languages such as OPENCL, CUDA, DIRECT COMPUTE, etc. In contrast, these simpler data structures typically organize large quantities of data into arrays of primitive data types, thus making it easier to operate on data in parallel.

Turning now to FIG. 1, a block diagram of a memory 100 storing two data structures 110 and 130 is depicted. Data structure 110 is one example of a more complicated data structure used in OOP. As shown, data structure 110 is stored non-contiguously in memory 110 by using an array 120 of pointers 122A-122E, which each point to (i.e., store the address of) a respective one of objects 124A-E. Each object 124 includes a respective set of fields storing ones of data values 126A1-126E2. Data structure 130, in turn, is one example of a simpler data structure more suitable for distributing tasks. Data structure 130 includes an array 140 storing data values 126A2, 126B2, 126D2, and 126E2 and is stored contiguously in memory 100.

Accessing large quantities of data values 126 in data structure 110 can be resource-usage intensive. To access a particular data value 126, multiple accesses may need to be performed in order to select a corresponding pointer 122 from array 120, reference the pointer 122 to identify the corresponding object 124, determine an offset for a field within the object 124, and read the field's memory location storing the value 126. Further, moving data structure 110 to another memory (e.g., a memory of a graphics-processing unit (GPU)) or even within memory 100 can also be tedious. Each portion of data structure 110 may need to be located and moved, new memory locations may need to be allocated, pointers 122A-E may need to be recalculated, etc. All of these disadvantages can reduce any benefit from parallelizing tasks, which typically perform multiple memory accesses and may need to easily move portions of data. As a result, many domain-specific languages do not support the usage of complicated data structures.

Data structure 130 is much easier to manipulate. Data values 126 are stored contiguously and can be determined with one memory access (instead of referencing multiple pointers). Data structure 130 can also be divided into smaller portions, which can be distributed more easily for offloading tasks. A problem with data structure 130 is that many tasks, which would benefit from parallelization, are developed around more complicated structures such as structure 110.

The present disclosure describes data transformation techniques that may overcome some of these shortcomings. As will be described below, in various embodiments, a processor in a computing platform may execute program instructions to determine whether to offload a set of tasks to a system resource (in some embodiments, this system resource may be another processor such as a GPU, second CPU, etc. or may be another core within the processor.). If the processor determines to offload the tasks and the tasks are to be performed using data stored in a more complex data structure (such as data values 126A2, 126B2, 126D2, and 126E2 in data structure 110), the processor may generate another data structure (such as data structure 130) that stores the data in manner better suited for offloading, and provide the generated data structure to the system resource. Once the tasks have been performed, the processor may execute program instructions to repopulate fields in the original data structure with the data operated on during performance of the tasks, so that the original data structure can continue to be used (e.g., by software developed using OOP).

In various embodiments, the data transformation techniques described herein may also be used in conjunction with a computing platform that is configured to convert (e.g., at runtime) bytecode (e.g., developed using OOP) to a domain-specific language (such as OPENCL, CUDA, etc.) for deploying tasks to various resources. To convert the bytecode, the processor, in some embodiments, may execute program instructions to reify bytecode into an intermediate form. The processor may then process this intermediate form to identify tasks and data structures specified by the bytecode. If the processor determines to offload ones of the identified tasks, the processor may further use the intermediate form to determine data to be used during performance of the tasks. If the data for a set of tasks is stored in a more complex data structure (e.g., a non-contiguous data structure), the processor may execute program instructions to extract the data and insert the data into a newly generated data structure, which is better for task distribution (e.g., an array that stores data contiguously).

In many instances, manipulating data in this manner allows object-oriented programs to take advantage of data-parallel capabilities provided by domain-specific languages, while permitting data to be stored in an object-oriented form in memory. Without such techniques, achieving good performance using a multiple, heterogeneous system resources may be difficult and require extensive rework to an application.

Before discussing the data transformation techniques in more detail, an overview of a computing platform configured to convert bytecode to a domain-specific language is described in conjunction with FIGS. 2-10. Data transformation techniques are described in further detail in conjunction with FIGS. 11-16. An exemplary computer system and exemplary computer readable medium, which may be used in accordance with the techniques described herein, is presented in conjunction with FIGS. 17 and 18, respectively.

Overview of Heterogeneous Computing Platform

Figure 2:
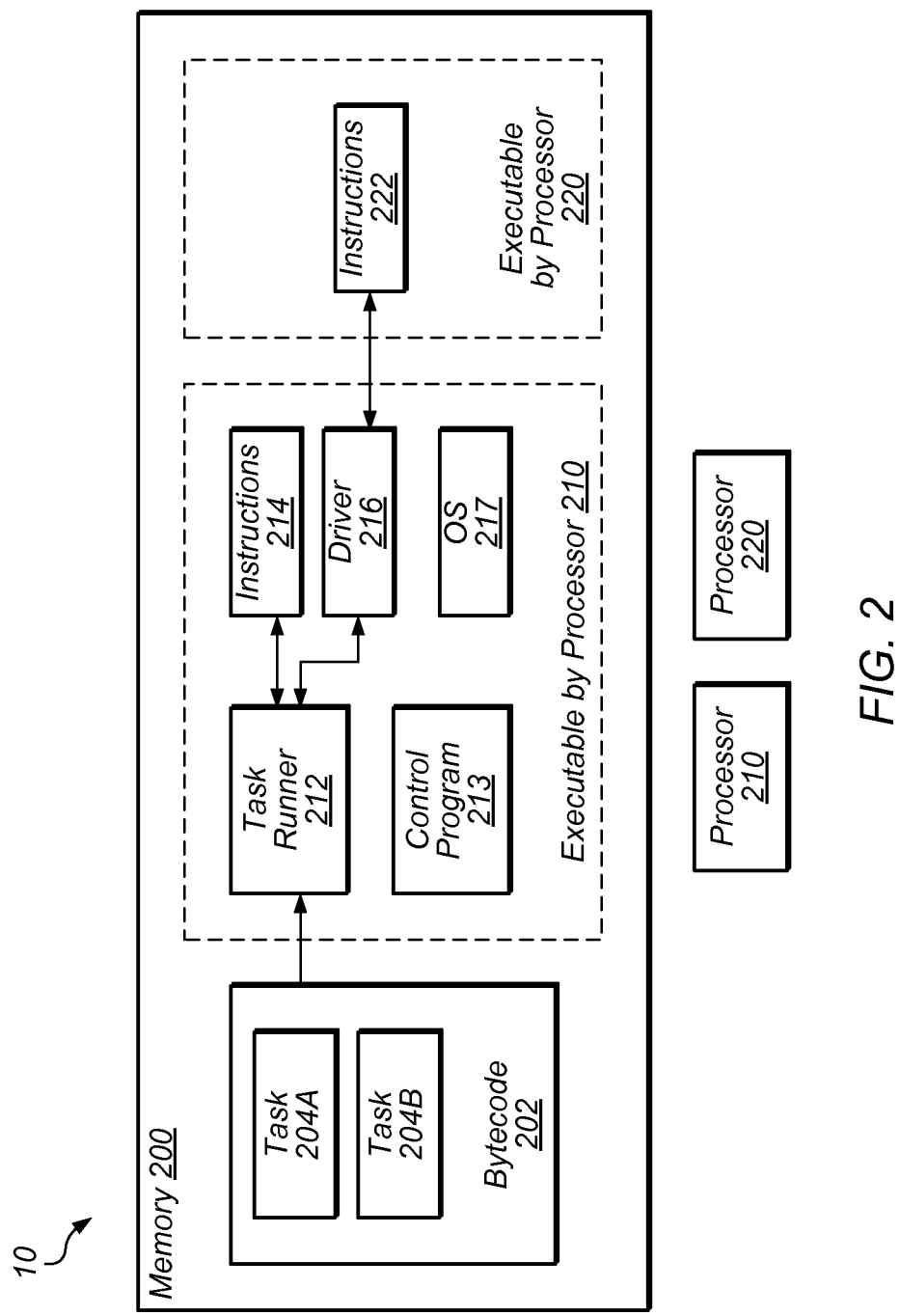
FIG. 2 is a block diagram illustrating one embodiment of a heterogeneous computing platform configured to convert bytecode to a domain-specific language.

Turning now to FIG. 2, one embodiment of a heterogeneous computing platform 10 configured to convert bytecode to a domain-specific language is depicted. As shown, platform 10 includes a memory 200, processor 210, and processor 220. In the illustrated embodiment, memory 200 includes bytecode 202, task runner 212, control program 213, instructions 214, driver 216, operating system (OS) 217, and instructions 222. In certain embodiments, processor 210 is configured to execute elements 212-217 (as indicated by the dotted line), while processor 220 is configured to execute instructions 222. Platform 10 may be configured differently in other embodiments.

Memory 200, in one embodiment, is configured to store information usable by platform 10. Although memory 200 is shown as a single entity, memory 200, in some embodiments, may correspond to multiple structures within platform 10 that are configured to store various elements such as those shown in FIG. 2. In one embodiment, memory 200 may include primary storage devices such as flash memory, random access memory (RAM-SRAM, EDO RAM, SDRAM, DDR SDRAM, RAMBUS RAM, etc.), read only memory (PROM, EEPROM, etc.). In one embodiment, memory 200 may include secondary storage devices such as hard disk storage, floppy disk storage, removable disk storage, etc. In one embodiment, memory 200 may include cache memory of processors 210 and/or 220. In some embodiments, memory 200 may include a combination of primary, secondary, and cache memory. In various embodiments, memory 200 may includes more (or less) elements than shown in FIG. 2.

Processor 210, in one embodiment, is a general-purpose processor. In one embodiment, processor 210 is a central processing unit (CPU) for platform 10. In one embodiment, processor 210 is a multi-threaded superscalar processor. In one embodiment, processor 210 includes a plurality of multi-threaded execution cores that are configured to operate independently of one another. It is noted that, while processors 210 and 220, may be described in may instances as being separate processors, in some embodiments, processors 210 and 220 may be separate cores within the same multi-core processor. In some embodiments, platform 10 may include additional processors similar to processor 210.

Processor 220, in one embodiment, is a coprocessor that is configured to execute workloads (i.e., groups of instructions or tasks) that have been offloaded from processor 210. In one embodiment, processor 220 is a special-purpose processor such as a DSP, a GPU, etc. In one embodiment, processor 220 is acceleration logic such as an ASIC, an FPGA, etc. In some embodiments, processor 220 is a multithreaded superscalar processor. In some embodiments, processor 220 includes a plurality of multithreaded execution cores. As noted above, in other embodiments, processor 220 may be another core within a multi-core processor.

Bytecode 202, in one embodiment, is compiled source code. In one embodiment, bytecode 202 may created by a compiler of a general-purpose programming language, such as BASIC, C/C++, FORTRAN, JAVA, PERL, etc. In one embodiment, bytecode 202 is directly executable by processor 210. That is, bytecode 202 may include instructions that are defined within the instruction set architecture (ISA) for processor 210. In another embodiment, bytecode 202 is interpretable (e.g., by a virtual machine) to produce (or coordinate dispatch of) instructions that are executable by processor 210. In one embodiment, bytecode 202 may correspond to an entire executable program. In another embodiment, bytecode 202 may correspond to a portion of an executable program. In various embodiments, bytecode 202 may correspond to one of a plurality of JAVA .class files generated by the JAVA compiler javac for a given program.

In one embodiment, bytecode 202 specifies a plurality of tasks 204A and 204B (i.e., workloads) for parallelization. As will be described below, in various embodiments, tasks 204 may be performed concurrently on processor 210 and/or processor 220. In one embodiment, bytecode 202 specifies tasks 204 by making calls to an application-programming interface (API) associated with task runner 212, where the API allows programmers to represent data parallel problems (i.e., problems that can be performed by executing multiple tasks 204 concurrently) in the same format (e.g., language) used for writing the rest of the source code. For example, in one particular embodiment, a developer writes JAVA source code that specifies a plurality of tasks 204 by extending a base class to encode a data parallel problem, where the base class is defined within the API and bytecode 202 is representative of the extend class. An instance of the extended class may then be provided to task runner 212 to perform tasks 204. In some embodiments, bytecode 202 may specify different sets of tasks 204 to be parallelized (or considered for parallelization).

Task runner 212, in one embodiment, is a module that is executable to determine whether to offload tasks 204 specified by bytecode 202 to processor 220. In one embodiment, bytecode 202 may pass a group of instructions (specifying a task) to task runner 212, which can then determine whether or not to offload the specified group of instructions to processor 220. Task runner 212 may base its determination on a variety of criteria. For example, in one embodiment, task runner 212 may determine whether to offload tasks based, at least in part, on whether driver 216 supports a particular domain-specific language. In one embodiment, if task runner 212 determines to offload tasks 204 to processor 220, task runner 212 causes processor 220 to execute tasks 204 by generating a set of instructions in a domain-specific language that are representative of tasks 204. (As used herein, "domain-specific instructions" are instructions that are written in a domain-specific language). In one embodiment, task runner 212 generates the set of instructions by converting bytecode 202 to domain-specific instructions using metadata contained in a .class file corresponding to bytecode 202. In other embodiments, if the original source code is still available (e.g., as may be the case with BASIC/JAVA/PERL, etc.), task runner 212 may perform a textual conversion of the original source code to domain-specific instructions. In the illustrated embodiment, task runner 212 provides these generated instructions to driver 216, which, in turn, generates instructions 222 for execution by processor 220. In one embodiment, task runner 212 may receive a corresponding set of results for tasks 204 from driver 216, where the results are represented in a format used by the domain-specific language. In some embodiments, after processor 220 has computed the results for a set of tasks 204, task runner 212 is executable to convert the results from the domain-specific language format into a format that is usable by instructions 214. For example, in one embodiment, task runner 212 may convert a set of results from OPENCL datatypes to JAVA datatypes. Task runner 212 may support any of a variety of domain-specific languages, such as OPENCL, CUDA, DIRECT COMPUTE, etc. In one embodiment, if task runner 212 determines to not offload tasks 204, processor 210 executes tasks 204. In various embodiments, task runner 212 may cause the execution of tasks 204 by generating (or causing generation of) instructions 214 for processor 210 that are executable to perform tasks 204. In some embodiments, task runner 212 is executable to optimize bytecode 202 for executing tasks 204 in parallel on processor 210. In some embodiments, task runner 212 may also operate on legacy code. For example, in one embodiment, if bytecode 202 is legacy code, task runner 212 may cause tasks performed by the legacy code to be offloaded to processor 220 or may optimize the legacy code for execution on processor 210.

In various embodiments, task runner 212 is executable to determine whether to offload tasks 204, generate a set of domain-specific instructions, and/or optimize bytecode 202 at runtime—i.e., while a program that includes bytecode 202 is being executed by platform 10. In other embodiments, task runner 212 may determine whether to offload tasks 204 prior to runtime. For example, in some embodiments, task runner 212 may preprocess bytecode 202 for a subsequent execution of a program including bytecode 202.

In one embodiment, task runner 212 is a program that is directly executable by processor 210. That is, memory 200 may include instructions for task runner 212 that are defined within the ISA for processor 210. In another embodiment, memory 200 may include bytecode of task runner 212 that is interpretable by control program 213 to produce instructions that are executable by processor 210. Task runner is described in below in conjunction with FIGS. 2 and 4-6.

Control program 213, in one embodiment, is executable to manage the execution of task runner 212 and/or bytecode 202. In some embodiments, control program 213 may manage task runner 212's interaction with other elements in platform 10—e.g., driver 216 and OS 217. In one embodiment, control program 213 is an interpreter that is configured to produce instructions (e.g., instructions 214) that are executable by processor 210 from bytecode (e.g., bytecode 202 and/or bytecode of task runner 212). For example, in some embodiments, if task runner 212 determines to execute a set of tasks on processor 210, task runner 212 may provide portions of bytecode 202 to control program 213 to produce instructions 214. Control program 213 may support any of a variety of interpreted languages, such as BASIC, JAVA, PERL, RUBY, etc. In one embodiment, control program 213 is executable to implement a virtual machine that is configured to implement one or more attributes of a physical machine and to execute bytecode. In some embodiments, control program 213 may include a garbage collector that is used to reclaim memory locations that are no longer being used. Control program 213 may correspond to any of a variety of virtual machines including SUN's JAVA virtual machine, ADOBE's AVM2, MICROSOFT's CLR, etc. In some embodiments, control program 213 may not be included in platform 10.

Instructions 214, in one embodiment, are representative of instructions that are executable by processor 210 to perform tasks 204. In one embodiment, instructions 214 are produced by control program 213 interpreting bytecode 202. As noted above, in one embodiment, instructions may be produced by task runner 212 working in conjunction with control program 213. In another embodiment, instructions 214 are included within bytecode 202. In various embodiments, instructions 214 may include instructions that are executable to operate upon results that have been produced from tasks 204 that have been offloaded to processor 220 for execution. For example, instructions 214 may include instructions that are dependent upon results of various ones of tasks 204. In some embodiments, instructions 214 may include additional instructions generated from bytecode 202 that are not associated with a particular task 204. In some embodiments, instructions 214 may include instructions that are generated from bytecode of task runner 212 (or include instructions from task runner 212).

Driver 216, in one embodiment, is executable to manage the interaction between processor 220 and other elements within platform 10. Driver 216 may correspond to any of a variety of driver types such as graphics card drivers, sound card drivers, DSP card drivers, other types of peripheral device drivers, etc. In one embodiment, driver 216 provides domain-specific language support for processor 220. That is, driver 216 may receive a set of domain-specific instructions and generate a corresponding set of instructions 222 that are executable by processor 220. For example, in one embodiment, driver 216 may convert OPENCL instructions for a given set of tasks 204 into ISA instructions of processor 220, and provide those ISA instructions to processor 220 to cause execution of the set of tasks 204. Driver 216 may, of course, support any of a variety of domain-specific languages. Driver 216 is described further below in conjunction with FIG. 4.

OS 217, in one embodiment, is executable to manage execution of programs on platform 10. OS 217 may correspond to any of a variety of known operating systems such as LINUX, WINDOWS, OSX, SOLARIS, etc. In some embodiments, OS 217 may be part of a distributed operation system. In various embodiments, OS may include a plurality of drivers to coordinate the interactions of software on platform 10 with one or more hardware components of platform 10. In one embodiment, driver 216 is integrated within OS 217. In other embodiments, driver 216 is not a component of OS 217.

Instructions 222, in one embodiment, represent instructions that are executable by processor 220 to perform tasks 204. As noted above, in one embodiment, instructions 222 are generated by driver 216. In another embodiment, instructions 222 may be generated differently—e.g., by task runner 212, control program 213, etc. In one embodiment, instructions 222 are defined within the ISA for processor 220. In another embodiment, instructions 222 may be commands that are used by processor 220 to generate a corresponding set of instructions that are executable by processor 220.

In various embodiments, platform 10 provides a mechanism that enables programmers to develop software that uses multiple resources of platform 10—e.g., processors 210 and 220. In some instances, a programmer may write software using a single general-purpose language (e.g., JAVA) without having an understanding of a particular domain-specific language—e.g., OPENCL. Since software can be written using the same language, a debugger that supports the language (e.g., the GNU debugger debugging JAVA via the ECLIPSE IDE) can debug an entire piece of software including the portions that make API calls to perform tasks 204. In some instances, a single version of software can be written for multiple platforms regardless of whether these platforms provide support for a particular domain-specific language, since task runner 212, in various embodiments, is executable to determine whether to offload tasks at runtime and can determine whether such support exists on a given platform 10. If, for example, platform 10 is unable to offload tasks 204, task runner 212 may still be able to optimize a developer's software so that it executes more efficiently. In fact, task runner 212, in some instances, may be better at optimizing software for parallelization than if the developer had attempted to optimize the software on his/her own.

Figure 3:
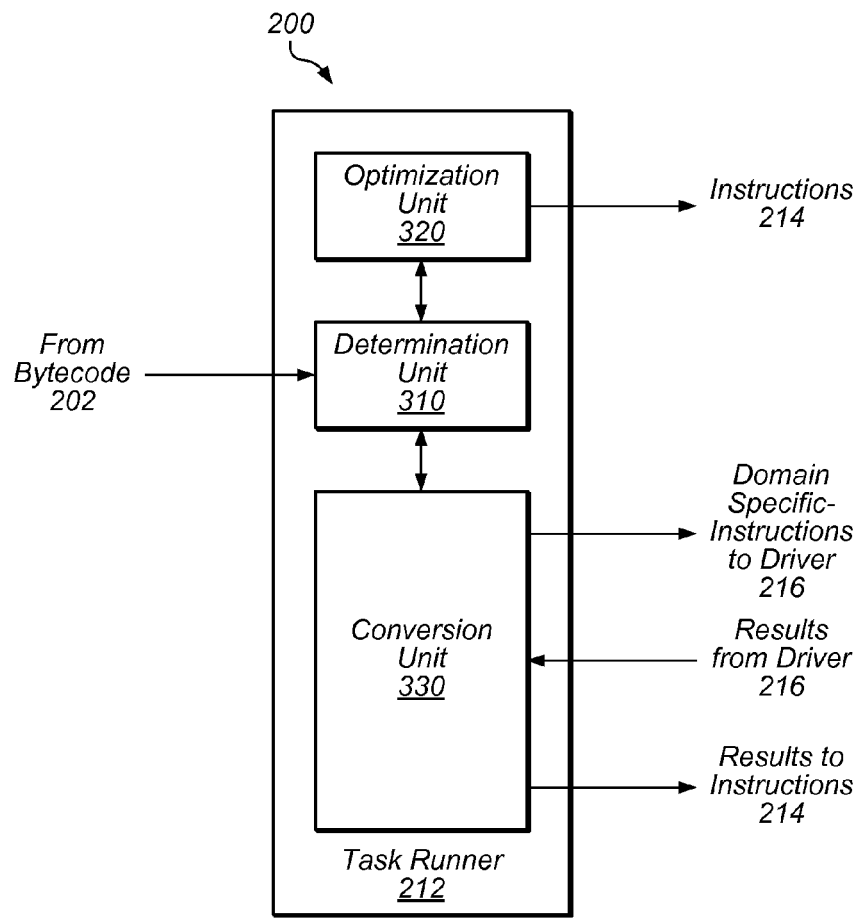
FIG. 3 is a block diagram illustrating one embodiment of a module that is executable to distribute tasks for parallelization.

Turning now to FIG. 3, a representation of one embodiment of a task runner software module 212 is depicted. As noted, task runner 212 is code (or memory storing such code) that is executable to receive a set of instructions (e.g., those assigned to processor 210) and determine whether to offload (i.e., reassign) those instructions to a different processor (e.g., processor 220). As shown, task runner 212 includes a determination unit 310, optimization unit 320, and conversion unit 330. In one embodiment, control program 213 (not shown in FIG. 3) is a virtual machine in which task runner 212 executes. For example, in one embodiment, control program 213 corresponds to the JAVA virtual machine, where task runner 212 is interpreted JAVA bytecode. In other embodiments, processor 210 may execute task runner 212 without using control program 213.

Determination unit 310, in one embodiment, is representative of program instructions that are executable to determine whether to offload tasks 204 to processor 220. In the illustrated embodiment, task runner 310 includes execution of instructions in determination unit 310 in response to receiving bytecode 202 (or at least a portion of bytecode 202). In one embodiment, task runner 310 initiates execution of instructions in determination unit 310 in response to receiving a JAVA .class file that includes bytecode 202.

In one embodiment, determination unit 310 may include instructions executable to determine whether to offload tasks based on a set of one or more initial criteria associated with properties of platform 10 and/or an initial analysis of bytecode 202. In various embodiments, such determination is automatic. In one embodiment, determination unit 310 may execute to make an initial determination based, at least in part, on whether platform 10 supports domain-specific language(s). If support does not exist, determination unit 310, in various embodiments, may not perform any further analysis. In some embodiments, determination unit 310 determines whether to offload tasks 204, based at least in part, on whether bytecode 202 references datatypes or calls methods that cannot be represented in a domain-specific language. For example, a particular domain-specific language may not support IEEE double-precision datatypes. Therefore, determination unit 310 may determine to not offload a JAVA workload that includes doubles. Similarly, JAVA supports the notion of a String datatype (actually a Class), which unlike most classes is understood by the JAVA virtual machine, but has no such representation in OPENCL. As a result, determination unit 310, in one embodiment, may determine that a JAVA workload referencing to such String datatypes is not be offloaded. In other embodiments, determination unit 310 may perform further analysis to determine if the uses of String might be 'mappable' to other OPENCL representable types—e.g., if String references can be removed and replaced by other code representations. In one embodiment, if a set of initial criteria is satisfied, task runner 212 may initiate execution of instructions in conversion unit 330 to convert bytecode 202 into domain-specific instructions.

In one embodiment, determination unit 310 continues to execute, based on an additional set of criteria, to determine whether to offload tasks 204 while conversion unit 330 executes. For example, in one embodiment, determination unit 310 determines whether to offload tasks 204 based, at least in part, on whether bytecode 202 is determined to have an execution path that results in an indefinite loop. In one embodiment, determination unit 310 determines to offload tasks 204 based, at least in part, on whether bytecode 202 attempts to perform an illegal action such as using recursion.

Additionally, determination unit 310 may also execute to determine whether to offload tasks 204 based, at least in part, on one or more previous executions of a set of tasks 204. For example, in one embodiment, determination unit 310 may store information about previous determinations for sets of tasks 204, such as indication of whether a particular set of tasks 204 was offloaded successfully. In some embodiments, determination unit 310 determines whether to offload tasks 204 based, at least in part, on whether task runner 212 stores a set of previously generated domain-specific instruction for that set of tasks 204. In various embodiments, determination unit 310 may collect information about previous iterations of a single portion of bytecode 202—e.g., where the portion of bytecode 202 specifies the same set of tasks 204 multiple times, as in a loop. Alternatively, determination unit 310 may collect information about previous executions that resulted from executing a program that includes bytecode 202 multiple times in different parts of a program. In one embodiment, determination unit 310 may collect information about the efficiency of pervious executions of tasks 204. For example, in some embodiments, task runner 212 may cause tasks 204 to be executed by processor 210 and by processor 220. If determination unit 310 determines that processor 210 executed the set of tasks more efficiently (e.g., using less time) than processor 220, determination unit 310 may determine to not offload subsequent executions of tasks 204. Alternately, if determination unit 310 determines that processor 220 is more efficient in executing the set of tasks, unit 310 may, for example, cache an indication to offload subsequent executions of the set of tasks.

Determination unit 310 is described below further in conjunction with FIG. 5.

Optimization unit 320, in one embodiment, is representative of program instructions that are executable to optimize bytecode 202 for execution of tasks 204 on processor 210. In one embodiment, task runner 212 may initiate execution of optimization unit 320 once determination unit 310 determines to not offload tasks 204. In various embodiments, optimization unit 320 analyzes bytecode 202 to identify portions of bytecode 202 that can be modified to improve parallelization. In one embodiment, if such portions are identified, optimization unit 320 may modify bytecode 202 to add thread pool support for tasks 204. In other embodiments, optimization unit 320 may improve the performance of tasks 204 using other techniques. Once portions of bytecode 202 have modified, optimization unit 320, in some embodiments, provides the modified bytecode 202 to control program 213 for interpretation into instructions 214. Optimization of bytecode 202 is described further below in conjunction with FIG. 6.

Conversion unit 330, in one embodiment, is representative of program instructions that are executable to generate a set of domain-specific instructions for execution of tasks 204 on processor 220. In one embodiment, execution of task runner 212 may include initiation of execution of conversion unit 330 once determination unit 310 determines that a set of initial criteria has been satisfied for offloading tasks 204. In the illustrated embodiment, conversion unit 330 provides a set of domain-specific instructions to driver 216 to cause processor 220 to execute tasks 204. In one embodiment, conversion unit 330 may receive a corresponding set of results for tasks 204 from driver 216, where the results are represented in a format of the domain-specific language. In some embodiments, conversion unit 330 converts the results from the domain-specific language format into a format that is usable by instructions 214. For example, in one embodiment, after task runner 212 has received a set of computed results from driver 216, task runner 212 may convert a set of results from OPENCL datatypes to JAVA datatypes. In one embodiment, task runner 212 (e.g., conversion unit 330) is executable to store a generated set of domain-specific instructions for subsequent executions of tasks 204. In some embodiments, conversion unit 330 generates a set of domain-specific instructions by converting bytecode 202 to an intermediate representation and then generating the set of domain-specific instructions from the intermediate representation. Converting bytecode 202 to a domain-specific language is described below further in conjunction with FIG. 7.

Note that units 310, 320, and 330 are exemplary; in various embodiments of task runner 212, instructions may be grouped differently.

Figure 4:
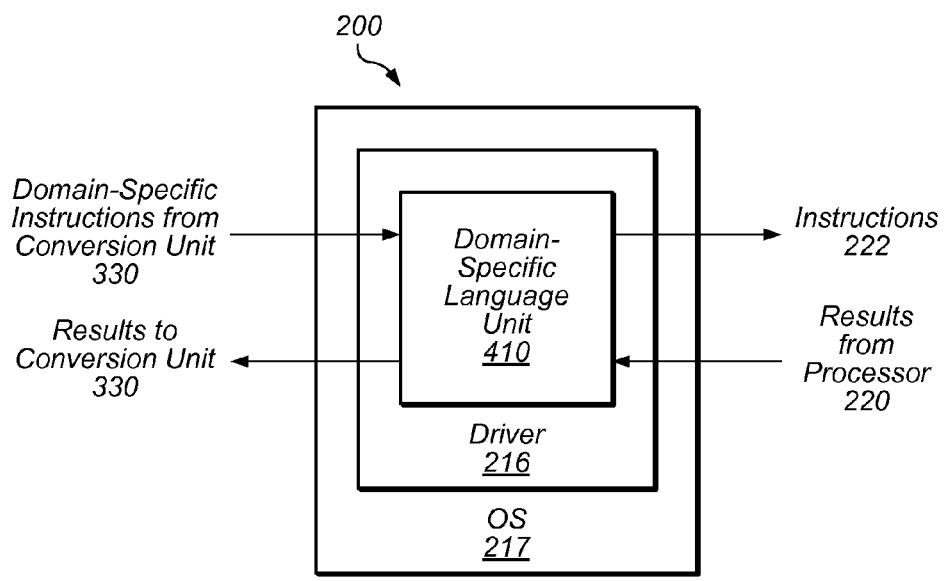
FIG. 4 is a block diagram illustrating one embodiment of a driver that provides domain-specific language support.

Turning now to FIG. 4, one embodiment of driver 216 is depicted. As shown, driver 216 includes a domain-specific language unit 410. In the illustrated embodiment driver 216 is incorporated within OS 217. In other embodiments, driver 216 may be implemented separately from OS 217.

Domain-specific language unit 410, in one embodiment, is executable to provide driver support for domain-specific language(s). In one embodiment, unit 410 receives a set of domain-specific instructions from conversion unit 330 and produces a corresponding set of instructions 222. In various embodiments, unit 410 may support any of a variety of domain-specific languages such as those described above. In one embodiment, unit 410 produces instructions 222 that are defined within the ISA for processor 220. In another embodiment, unit 410 produces non-ISA instructions that cause processor 220 to execute tasks 204—e.g., processor 220 may use instructions 222 to generate a corresponding set of instructions that are executable by processor 220.

Once processor 220 executes a set of tasks 204, domain-specific language unit 410, in one embodiment, receives a set of results and converts those results into datatypes of the domain-specific language. For example, in one embodiment, unit 410 may convert received results into OPENCL datatypes. In the illustrated embodiment, unit 410 provides the converted results to conversion unit 330, which, in turn, may convert the results from datatypes of the domain-specific language into datatypes supported by instructions 214—e.g., JAVA datatypes.

Figure 5:
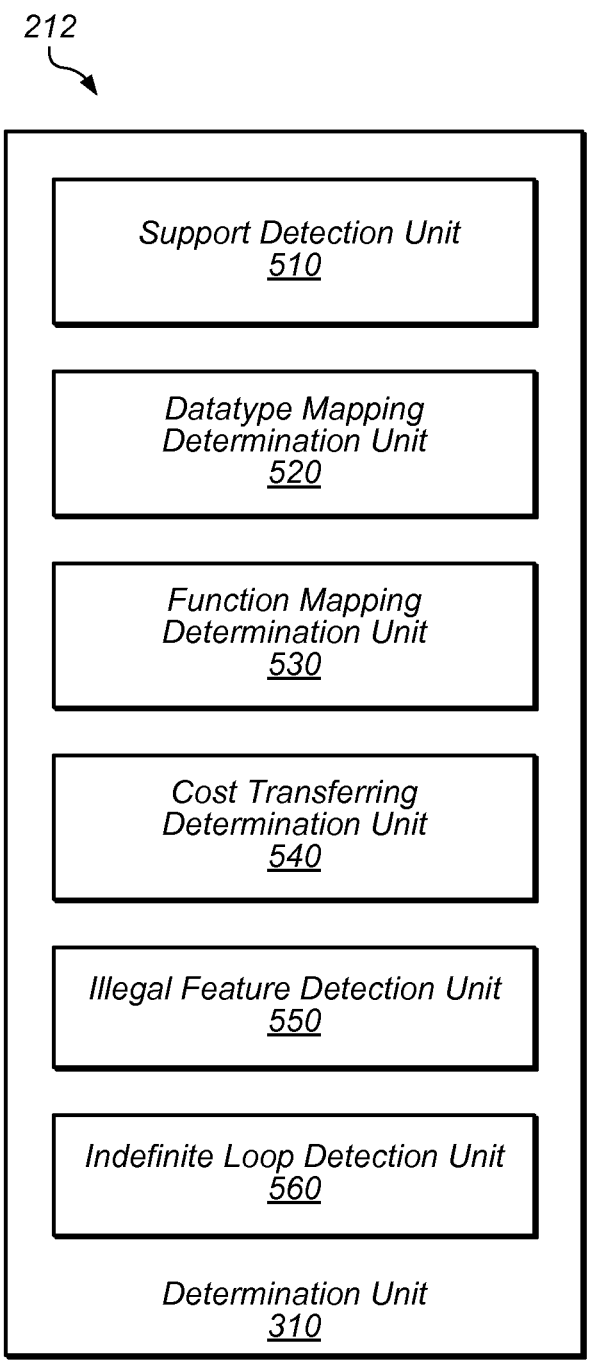
FIG. 5 is a block diagram illustrating one embodiment of a determination unit of a module executable to distribute tasks for parallelization.

Turning now to FIG. 5, one embodiment of determination unit 310 is depicted. In the illustrated embodiment, determination unit 310 includes a plurality of units 510-560 for performing various tests on received bytecode 202. In other embodiments, determination unit 310 may include additional units, fewer units, or different units from those shown. In some embodiments, determination unit 310 may perform various ones of the depicted tests in parallel. In one embodiment, determination unit 310 may test various ones of the criteria at different stages during the generation of domain-specific instructions from bytecode 202.

Support detection unit 510, in one embodiment, is representative of program instructions that are executable to determine whether platform 10 supports domain-specific language(s). In one embodiment, unit 510 determines that support exists based on information received from OS 217—e.g., system registers. In another embodiment, unit 510 determines that support exists based on information received from driver 216. In other embodiments, unit 510 determines that support exists based on information from other sources. In one embodiment, if unit 510 determines that support does not exist, determination unit 310 may conclude that tasks 204 cannot be offloaded to processor 220.

Datatype mapping determination unit 520, in one embodiment, is representative of program instructions that are executable to determine whether bytecode 202 references any datatypes that cannot be represented in the target domain-specific language—i.e., the domain-specific language supported by driver 216. For example, if bytecode 202, in one embodiment, is JAVA bytecode, datatypes, such as int, float, double, byte, or arrays of such primitives, may have corresponding datatypes in OPENCL. In one embodiment, if unit 520 determines that bytecode 202 references datatypes that cannot be represented in the target domain-specific language for a set of tasks 204, determination unit 310 may determine to not offload that set of tasks 204.

Function mapping determination unit 530, in one embodiment, is representative of program instructions that are executable to determine whether bytecode 202 calls any functions (e.g., routines/methods) that are not supported by the target domain-specific language. For example, if bytecode 202 is JAVA bytecode, unit 530 may determine whether the JAVA bytecode invokes a JAVA specific function (e.g., System.out.println) for which there is no equivalent in OPENCL. In one embodiment, if unit 530 determines that bytecode 202 calls unsupported functions for a set of tasks 204, determination unit 310 may determine to abort offloading the set of tasks 204. On the other hand, if bytecode code 202 calls only those functions that are supported in the target domain-specific language (e.g., JAVA's Math.sqrt( ) function which is compatible with OPENCL's sqrt( ) function), determination unit 310 may allow offloading to continue.]

Cost transferring determination unit 540, in one embodiment, is representative of program instructions that are executable to determine whether the group size of a set of tasks 204 (i.e., number of parallel tasks) is below a predetermined threshold—indicating that the cost of offloading is unlikely to be cost effective. In one embodiment, if unit 540 determines that the group size is below the threshold, determination unit 310 may determine to abort offloading the set of tasks 204. Unit 540 may perform various other checks to compare an expected benefit of offloading to an expected cost.

Illegal feature detection unit 550, in one embodiment, is representative of program instructions that are executable to determine whether bytecode 202 is using a feature that is syntactically acceptable but illegal. For example, in various embodiments, driver 216 may support a version of OPENCL that forbids methods/functions to use recursion (e.g., that version does not have a way to represent stack frames required for recursion). In one embodiment, if unit 550 determines that JAVA code may perform recursion, then determination unit 310 may determine to not deploy that JAVA code as this may result in an unexpected runtime error. In one embodiment, if unit 550 detects such usage for a set of tasks 204, determination unit 310 may determine to abort offloading.

Indefinite loop detection unit 560, in one embodiment, is representative of program instructions that are executable to determine whether bytecode 202 has any paths of execution that may possibly loop indefinitely—i.e., result in an indefinite/infinite loop. In one embodiment, if unit 560 detects any such paths associated with a set of tasks 204, determination unit 310 may determine to abort offloading the set of tasks 204.

As noted above, determination unit 310 may test various criteria at different stages during the conversion process of bytecode 202. If, at any point, one of the tests fails for a set of tasks, determination unit 310, in various embodiments, can immediately determine to abort offloading. By testing criteria in this manner, determination unit 310, in some instances, can quickly arrive a determination to abort offloading before expending significant resources on the conversion of bytecode 202.

Figure 6:
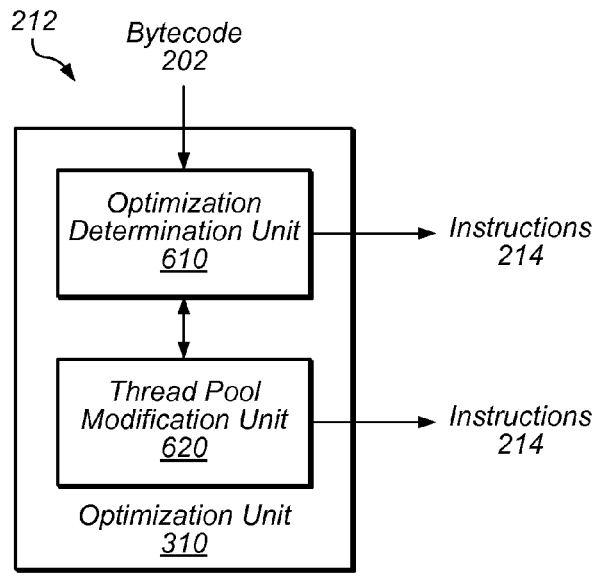
FIG. 6 is a block diagram illustrating one embodiment of an optimization unit of a module executable to distribute tasks for parallelization.

Turning now to FIG. 6, one embodiment of optimization unit 320 is depicted. In one embodiment, task runner 212 may initiate execution of optimization unit 320 in response to determination unit 310 determining to abort offloading of a set of tasks 204. In another embodiment, task runner 212 may initiate execution of optimization unit 320 in conjunction with the conversion unit 330—e.g., before determination unit 310 has determined whether to abort offloading. In the illustrated embodiment, optimization unit 320 includes optimization determination unit 610 and thread pool modification unit 620. In some embodiments, optimization unit 320 includes additional units for optimizing bytecode 202 using other techniques.

Optimization determination unit 610, in one embodiment, is representative of program instructions that are executable to identify portions of bytecode 202 that can be modified to improve execution of tasks 204 by processor 210. In one embodiment, unit 610 may identify portions of bytecode 202 that include calls to an API associated with task runner 212. In one embodiment, unit 610 may identify particular structural elements (e.g., loops) in bytecode 202 for parallelization. In one embodiment, unit 610 may identify portions by analyzing an intermediate representation of bytecode 202 generated by conversion unit 330 (described below in conjunction with FIG. 7). In one embodiment, if unit 610 determines that portions of bytecode 202 can be modified to improve the performance of a set of tasks 204, optimization unit 310 may initiate execution of thread pool modification unit 620. If unit 610 determines that portions of bytecode 202 cannot be improved via predefined mechanisms, unit 610, in one embodiment, provides those portions to control program 213 without any modification, thus causing control program 213 to produce corresponding instructions 214.

Thread pool modification unit 620, in one embodiment, is representative of program instructions that are executable to add support for creating a thread pool that is used by processor 210 to execute tasks 204. For example, in various embodiments, unit 620 may modify bytecode 202 in preparation of executing the data parallel workload on the originally targeted platform (e.g., processor 210) assuming that no offload was possible. Thus, by using task runner 212 and providing a base class that is extendable by a programmer, the programmer can declare that the code is intended to be parallelized (e.g., executing in an efficient data parallel manner). In a JAVA environment, this means the default JAVA implementation of task runner 212 may use a thread pool by coordinating the execution of the code without transforming it. If the code is offloadable then it is assumed that the platform to which the code is offloaded coordinates parallel execution. As used herein, a "thread pool" is a queue that includes a plurality of threads for execution. In one embodiment, a thread may be created for each task 204 in a given set of tasks. When a thread pool is used, a processor (e.g., processor 210) removes threads from the pool as resources become available to execute those threads. Once a thread completes execution, the results of the thread's execution, in some embodiments, are placed in the corresponding queue until the results can be used.

Consider the situation in which bytecode 202 specifies a set of 2000 tasks 204. In one embodiment, unit 620 may add support to bytecode 202 so that it is executable to create a thread pool that includes 2000 threads—one for each task 204. In one embodiment, if processor 210 is a quad-core processor, each core can execute 600 of the tasks 204. If each core can execute 4 threads at a time, 16 threads can be executed concurrently. Accordingly, processor 210 can execute a set of tasks 204 significantly faster than if tasks 204 were executed sequentially.

Figure 7:
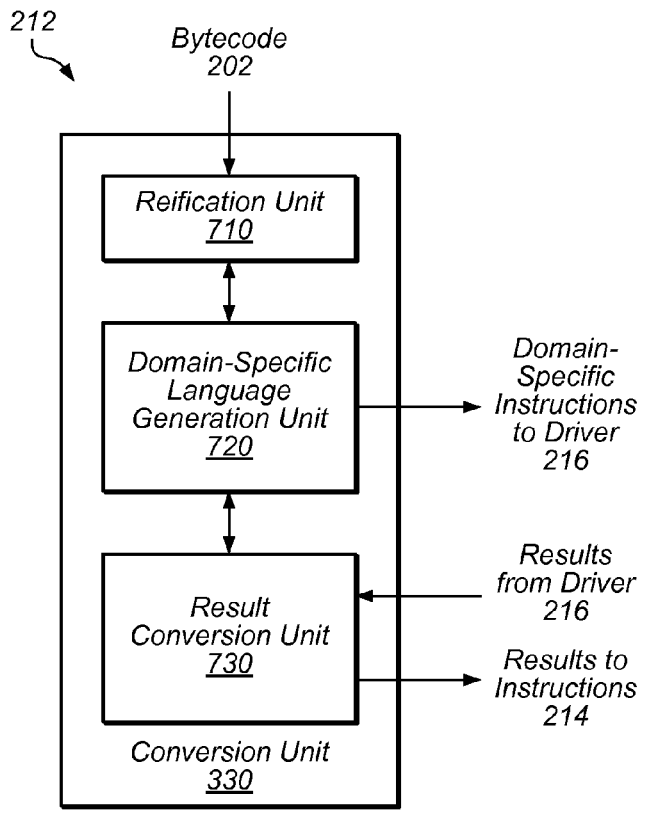
FIG. 7 is a block diagram illustrating one embodiment of a conversion unit of a module executable to distribute tasks for parallelization.

Turning now to FIG. 7, one embodiment of a conversion unit 330 is depicted. As noted above, in one embodiment, task runner 212 may initiate execution of conversion unit 330 in response to determination unit 310 determining that a set of initial criteria for offloading a set of tasks 204 has been satisfied. In another embodiment, task runner 212 may initiate execution of conversion unit 330 in conjunction with the optimization unit 320. In the illustrated embodiment, conversion unit 330 includes reification unit 710, domain-specific language generation unit 720, and result conversion unit 730. In other embodiments, conversion unit 330 may be configured differently.

Reification unit 710, in one embodiment, is representative of program instructions that are executable to reify bytecode 202 and produce an intermediate representation of bytecode 202. As used herein, reification refers to the process of decoding bytecode 202 to abstract information included therein. In one embodiment, unit 710 begins by parsing bytecode 202 to identify constants that are used during execution. In some embodiments, unit 710 identifies constants in bytecode 202 by parsing the contant_pool portion of a JAVA .class file for constants such as integers, Unicode, strings, etc. In some embodiments, unit 710 also parses the attribute portion of the .class file to reconstruct attribute information usable to produce the intermediate representation of bytecode 202. In one embodiment, unit 710 also parses bytecode 202 to identify any method used by bytecode. In some embodiments, unit 710 identifies methods by parsing the methods portion of a JAVA .class file. In one embodiment, once unit 710 has determined information about constants, attributes, and/or methods, unit 710 may begin decode instructions in bytecode 202. In some embodiments, unit 710 may produce the intermediate representation by constructing an expression tree from the decoded instructions and parsed information. In one embodiment, after unit 710 completes adding information to the expression tree, unit 710 identifies higher-level structures in bytecode 202, such as loops, nested if statements, etc. In one embodiment, unit 710 may identify particular variables or arrays that are known to be read by bytecode 202. Additional information about reification can be found in "A Structuring Algorithm for Decompilation (1993)" by Cristina Cifuentes.

Domain-specific language generation unit 720, in one embodiment, is representative of program instructions that are executable to generate domain-specific instructions from the intermediate representation generated by reification unit 710. In one embodiment, unit 720 may generate domain-specific instructions that include corresponding constants, attributes, or methods identified in bytecode 202 by reification unit 710. In some embodiments, unit 720 may generate domain-specific instructions that have corresponding higher-level structures to those in bytecode 202. In various embodiments, unit 720 may generate domain-specific instructions based on other information collected by reification unit 710. In some embodiments, if reification unit 710 identifies particular variables or arrays that are known to be read by bytecode 202, unit 720 may generate domain-specific instructions to place the arrays/values in 'READ ONLY' storage or to mark the arrays/values as READ ONLY in order to allow code optimization. Similarly, unit 720 may generate domain-specific instructions to tag values as WRITE_ONLY or READ_WRITE.

Results conversion unit 730, in one embodiment, is representative of program instructions that are executable to convert results for tasks 204 from a format of a domain-specific language to a format supported by bytecode 202. For example, in one embodiment, unit 730 may convert results (e.g., integers, booleans, floats, etc.) from an OPENCL datatype format to a JAVA datatype format. In some embodiments, unit 730 converts results by copying data to a data structure representation that is held by the interpreter (e.g., control program 213). In some embodiments, unit 730 may change data from a big-endian representation to little-endian representation. In one embodiment, task runner 212 reserves a set of memory locations to store the set of results generated from the execution of a set of tasks 204. In some embodiments, task runner 212 may reserve the set of memory locations before domain-specific language generation unit 720 provides domain-specific instructions to driver 216. In one embodiment, unit 730 prevents the garbage collector of control program 213 from reallocating the memory locations while processor 220 is producing the results for the set of tasks 204. That way, unit 730 can store the results in the memory location upon receipt from driver 216.

Various methods that employ the functionality of units described above are presented next.

Figure 8:
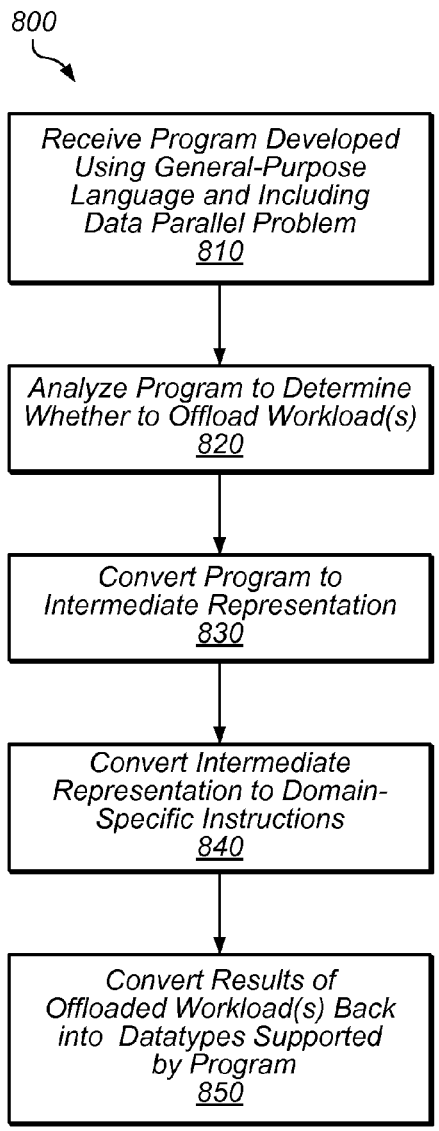
FIG. 8 is a flow diagram illustrating one embodiment of a method for automatically deploying workloads in a computing platform.

Turning now to FIG. 8, one embodiment of a method 800 for automatically deploying workloads in a computing platform is depicted. In one embodiment, platform 10 performs method 800 to offload workloads (e.g., tasks 204) specified by a program (e.g., bytecode 202) to a coprocessor (e.g., processor 220). In some embodiments, platform 10 performs method 800 by executing program instructions (e.g., on processor 210) that are generated by a control program (e.g., control program 213) interpreting bytecode (e.g., of task runner 212). In the illustrated embodiment, method 800 includes steps 810-850. Method 800 may include additional (or fewer) steps in other embodiments. Various ones of steps 810-850 may be performed concurrently, at least in part.

In step 810, platform 10 receives a program (e.g., corresponding to bytecode 202 or including bytecode 202) that is developed using a general-purpose language and that includes a data parallel problem. In some embodiments, the program may have been developed in JAVA using an API that allows a developer to represent the data parallel problem by extending a base class defined within the API. In other embodiments, the program may be developed using a different language, such as the ones described above. In other embodiments, the data parallel problem may be represented using other techniques. In one embodiment, the program may be interpretable bytecode—e.g., that is interpreted by control program 213. In another embodiment, the program may be executable bytecode that is not interpretable.

In step 820, platform 10 analyzes (e.g., using determination unit 310) the program to determine whether to offload one or more workloads (e.g., tasks 204)—e.g., to a coprocessor such as processor 220 (the term "coprocessor" is used to denote a processor other than the one that is executing method 900). In one embodiment, platform 10 may analyze a JAVA .class file of the program to determine whether to perform the offloading. Platform 10's determination may be various combinations of the criteria described above. In one embodiment, platform 10 makes an initial determination based on a set of initial criteria. In some embodiments, if each of the initial criteria is satisfied, method 800 may proceed to steps 830 and 840. In one embodiment, platform 10 may continue to determine whether to offload workloads, while steps 830 and 840 are being performed, based on various additional criteria. In various embodiments, platform 10's analysis may be based on cached information for previously offloaded workloads.

In step 830, platform 10 converts (e.g., using conversion unit 330) the program to an intermediate representation. In one embodiment, platform 10 converts the program by parsing a JAVA .class file of the program to identify constants, attributes, and/or methods used by the program. In some embodiments, platform 10 decodes instructions in the program to identify higher-level structures in the program such as loops, nested if statements, etc. In some embodiments, platform 10 creates an expression tree to represent the information collected by reifying the program. In various embodiments, platform 10 may use any of the various techniques described above. In some embodiments, this intermediate representation may be analyzed to further to determine whether to offload workloads.

In step 840, platform 10 converts (e.g., using conversion unit 330) the intermediate representation to a domain-specific language. In one embodiment, platform 10 generates domain-specific instruction (e.g., OPENCL) instructions based on information collected in step 830. In some embodiments, platform 10 generates the domain-specific instructions from an expression-tree constructed in step 830. In one embodiment, platform 10 provides the domain-specific instructions to a driver of the coprocessor (e.g., driver 216 of processor 220) to cause the coprocessor to execute the offloaded workloads.

In step 850, platform 10 converts (e.g., using conversion unit 330) the results of the offloaded workloads back into datatypes supported by the program. In one embodiment, platform 10 converts the results from an OPENCL datatypes back into JAVA datatypes. Once the results have been converted, instructions of the program may be executed that use the converted results. In one embodiment, platform 10 may allocate memory locations to store results before providing the domain-specific instructions to the driver of the coprocessor. In some embodiments, platform 10 may prevent these locations from being reclaimed by a garbage collector of the control program while the coprocessor is producing the results.

It is noted that method 800 may be performed multiple times for different received programs. Method 800 may also be repeated if the same program (e.g., set of instructions) is received again. If the same program is received twice, various ones of steps 810-850 may be omitted. As noted above, in some embodiments, platform 10 may cache information about previously offloaded workloads such as information generated during steps 820-840. If program is received again, platform 10, in one embodiment, may perform a cursory determination in step 820, such as determining whether the workloads were previously offloaded successfully. In some embodiments, platform 10 may then use previously cached domain-specific instructions instead of performing steps 830-840. In some embodiments in which the same set of instructions is received again, step 850 may still be performed in a similar manner as described above.

Various steps of method 800 may also be repeated if a program specifies that a set of workloads be performed multiple times using different inputs. In such instances, steps 830-840 may be omitted and previously cached domain-specific instructions may be used. In various embodiments, step 850 may still be performed.

Figure 9:
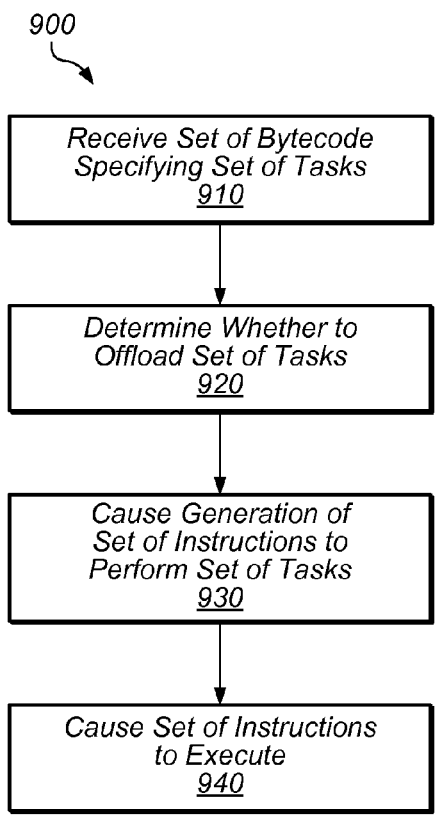
FIG. 9 is a flow diagram illustrating another embodiment of a method for automatically deploying workloads in a computing platform.

Turning now to FIG. 9, another embodiment of a method for automatically deploying workloads in a computing platform is depicted. In one embodiment, platform 10 executes task runner 212 to perform method 900. In some embodiments, platform 10 executes task runner 212 on processor 210 by executing instructions produced by control program 213 as it interprets bytecode of task runner 212 at runtime. In the illustrated embodiment, method 900 includes steps 910-940. Method 900 may include additional (or fewer) steps in other embodiments. Various ones of steps 910-940 may be performed concurrently.

In step 910, task runner 212 receives a set of bytecode (e.g., bytecode 202) specifying a set of tasks (e.g., tasks 204). As noted above, in one embodiment, bytecode 202 may include calls to an API associated with task runner 212 to specify the tasks 204. For example, in one particular embodiment, a developer writes JAVA source code that specifies a plurality of tasks 204 by extending a base class defined within the API, where bytecode 202 is representative of the extended class. An instance of the extended class may then be provided to task runner 212 to perform tasks 204. In some embodiments, step 910 may be performed in a similar manner as step 810 described above.

In step 920, task runner 212 determines whether to offload the set of tasks to a coprocessor (e.g. processor 220). In one embodiment, task runner 212 (e.g., using determination unit 310) may analyze a JAVA .class file of the program to determine whether to offload tasks 204. In one embodiment, task runner 212 may make an initial determination based on a set of initial criteria. In some embodiments, if each of the initial criteria is satisfied, method 900 may proceed to step 930. In one embodiment, platform 10 may continue to determine whether to offload workloads, while step 930 is being performed, based on various additional criteria. In various embodiments, task runner 212's analysis may also be based, at least in part, on cache information for previously offloaded tasks 204. Task runner 212's determination may be based on any of the various criteria described above. In some embodiments, step 920 may be performed in similar manner as step 820 described above.

In step 930, task runner 212 causes generation of a set of instructions to perform the set of tasks. In one embodiment, task runner 212 causes generation of the set of instructions by generating a set of domain-specific instructions having a domain-specific language format and providing the set of domain-specific instructions to driver 216 to generate the set of instructions in the different format. For example, in one embodiment, task runner 212 may generate a set of OPENCL instructions and provide those instructions to driver 216. In one embodiment, driver 216 may, in turn, generate a set of instructions for the coprocessor (e.g., instructions within the ISA of the coprocessor). In one embodiment, task runner 212 may generate the set of domain-specific instructions by reifying the set of bytecode to produce an intermediary representation of the set of bytecode and converting the intermediary representation to produce the set of domain-specific instructions.

In step 940, task runner 212 causes the coprocessor to execute the set of instructions by causing the set of instructions to be provided to the coprocessor. In one embodiment, task runner 212 may cause the set of instructions to be provided to the coprocessor by providing driver 216 with the set of generated domain-specific instructions. Once the coprocessor executes the set of instructions provided by driver 216, the coprocessor, in one embodiment, may provide driver 216 with the results of executing the set of instructions. In one embodiment, task runner 212 converts the results back into datatypes supported by bytecode 202. In one embodiment, task runner 212 converts the results from OPENCL datatypes back into JAVA datatypes. In some embodiments, task runner 212 may prevent the garbage collector from reclaiming memory locations used to the store the generated results. Once the results have been converted, instructions of the program that use the converted results may be executed.

As with method 800, method 900 may be performed multiple times for bytecode of different received programs. Method 900 may also be repeated if the same program is received again or includes multiple instances of the same bytecode. If the same bytecode is received twice, various ones of steps 910-940 may be omitted. As noted above, in some embodiments, task runner 212 may cache information about previously offloaded tasks 204, such as information generated during steps 920-940. If bytecode is received again, task runner 212, in one embodiment, may perform a cursory determination to offload tasks 204 in step 920. Task runner 212 may then perform step 940 using previously cached domain-specific instructions instead of performing step 930.

Note that method 900 may be performed differently in other embodiments. In one embodiment, task runner 212 may receive a set of bytecode specifying a set of tasks (as in step 910). Task runner 212 may then cause generation of a set of instructions to perform the set of tasks (as in step 930) in response to determining to offload the set of tasks to the coprocessor, where the determining may be performed by software other than task runner 212. Task runner 212 may then cause the set of instructions to be provided to the coprocessor for execution (as in step 940). Thus, method 900 may not include step 920 in some embodiments.

Figure 10:
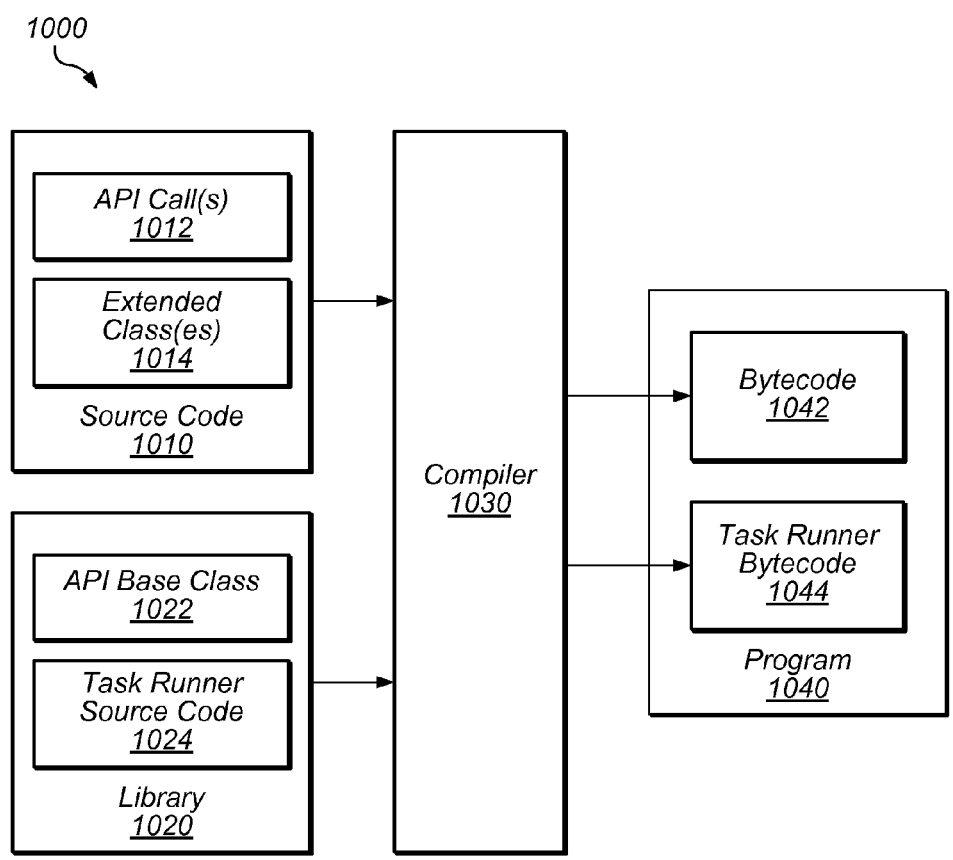
FIG. 10 is a block diagram illustrating one embodiment of an exemplary compilation of program instructions.

Turning now to FIG. 10, one embodiment of an exemplary compilation 1000 of program instructions is depicted. In the illustrated embodiment, compiler 1030 compiles sources code 1010 and library 1020 to produce program 1040. In some embodiments, compilation 1000 may include compiling additional pieces of source code and/or library source code. In some embodiments, compilation 1000 may be performed differently depending upon the program language being used.

Source code 1010, in one embodiment, is source code written by a developer to perform a data parallel problem. In the illustrated embodiment, source code 1010 includes one or more API calls 1012 to library 1020 to specify one or more sets of tasks for parallelization. In one embodiment, an API call 1012 specifies an extended class 1014 of an API base class 1022 defined within library 1020 to represent the data parallel problem. Source code 1010 may be written in any of a variety of languages, such as those described above.

Library 1020, in one embodiment, is an API library for task runner 212 that includes API base class 1022 and task runner source code 1024. (Note that task runner source code 1024 may be referred to herein as "library routine"). In one embodiment, API base class 1022 includes library source code that is compilable along with source code 1010 to produce bytecode 1042. In various embodiments, API base class 1022 may define one or more variables and/or one or more functions usable by source code 1010. As noted above, API base class 1022, in some embodiments, is a class that is extendable by a developer to produce one or more extended classes 1014 to represent a data parallel problem. In one embodiment, task runner source code 1024 is source code that is compilable to produce task runner bytecode 1044. In some embodiments, task runner bytecode 1044 may be unique to given set of bytecode 1042. In another embodiment, task runner bytecode 1044 may be usable with different sets of bytecode 1042 that are compiled independently of task runner bytecode 1044.

As noted above, compiler 1030, in one embodiment, is executable to compile sources code 1010 and library 1020 to produce program 1040. In one embodiment, compiler 1030 produces program instructions that are to be executed by a processor (e.g. processor 210). In another embodiment, compiler produces program instructions that are to be interpreted to produce executable instructions at runtime. In one embodiment, source code 1010 specifies the libraries (e.g., library 1020) that are to be compiled with source code 1010. Compiler 1030 may then retrieve the library source code for those libraries and compile it with source code 1010. Compiler 1030 may support any of a variety of languages, such as described above.

Program 1040, in one embodiment, is a compiled program that is executable by platform 10 (or interpretable by control program 213 executing on platform 10). In the illustrated embodiment, program 1040 includes bytecode 1042 and task runner bytecode 1044. For example, in one embodiment, program 1040 may correspond to a JAVA .jar file that include respective .class files for bytecode 1042 and bytecode 1044. In other embodiments, bytecode 1042 and bytecode 1044 may correspond to separate programs 1040. In various embodiments, bytecode 1042 corresponds to bytecode 202 described above. (Note that bytecode 1044 may be referred to herein as a "compiled library routine").

As will be described with reference to FIG. 18, various ones of elements 1010-1040 or portions of ones of elements 1010-1040 may be included on computer-readable storage media.

One example of possible source code that may be compiled by compiler 1030 that uses library 1020 to produce program 1040 is presented below. In this example, an array of floats (values[ ]) is initialized with a set random values. The array is then is processed to determine, for a given element in the array, how many other elements in the same array fall with a predefined window (e.g., +/−2.0). The results of these determinations are then stored in respective locations within a corresponding integer array (counts[ ]).

To initialize values in the values in the array (values [ ]) the following code may be run:

```
int size = 1024*16;
final float width = 1.2f;
final float[ ] values = new float[size];
final float[ ] counts = new float[size];
// create random data
for (int i = 0; i < size; i++) {
    values[i] = (float) Math.random( ) * 10f;
}
```

Traditionally, the above problem may be solved using the following code sequence:

```
for (int myId = 0; myId < size; myId++) {
    int count = 0;
    for (int i = 0; i < size; i++) {
        if (values[i] > values[myId] – width && values[i]
< values[myId] + width) {
            count++;
        }
    }
    counts[myId] = (float) count;
}
```

In accordance with the present disclosure, the above problem may now be solved using the following code in one embodiment:

```
Task task = new Task( ){
    public void run( ) {
        int myId = getGlobalId(0);
        int count = 0;
        for (int i = 0; i < size; i++) {
            if (values[i] > values[myId] – width && values[i]
<           values[myId] + width) {
                count++;
            }
        }
        counts[myId] = (float) count;
    }
}
```

This code extends the base class "Task" overriding the routine run( ). That is, the base class may include the method/function run( ) and the extended class may specify a preferred implementation of run ( ) for a set of tasks 204. In various embodiments, task runner 212 is provided the bytecode of this extended class (e.g., as bytecode 202) for automatic conversion and deployment. In various embodiments, if the method Task.run( ) is converted and deployed (i.e., offloaded), the method Task.run ( ) may not be executed, but rather the converted/deployed version of Task.run( ) is executed—e.g., by processor 220. If, however, Task.run( ) is not converted and deployed, Task.run( ) may be performed—e.g., by processor 210.

In one embodiment, the following code is executed to create an instance of task runner 212 to perform the tasks specified above. Note that the term "TaskRunner" corresponds to task runner 212.

```
TaskRunner taskRunner = new TaskRunner(task);
taskRunner.execute(size, 16);
```

The first line creates an instance of task runner 212 and provides task runner 212 with an instance of the extended base class "task" as input.

In one embodiment, task runner 212 may produce the following OPENCL instructions when task runner 212 is executed:

```
__kernel void run(
    __global float *values,
    __global int *counts
){
    int myId=get_global_id(0);
    int count=0;
    for(int i = 0; i<16384; i++){
        if(values[i]>values[myId]–1.2f){
            if(values[i]<values[myId]+1.2f){
                count++;
            }
        }
    }
    counts[myId] = counts[myId]+1;
    return;
}
```

As described above, in some embodiments, this code may be provided to driver 216 to generate a set of instruction for processor 220.

Data Transformation

As discussed above, performance of a set of tasks (e.g., tasks 204) may be dependent on data stored in a manner that is less suitable for parallelization and offloading. To account for this layout in various embodiments, a processor (such as processor 210, which may be any of the various processors described above, or may be a core within a multi-core processor) may execute program instructions to transform the layout of the data before offloading tasks to another system resource (such as processor 220, which may be any of the various processors described above, or may be another core within a multi-core processor). In the following discussion, such functionality is described as being included within conversion unit 330 of task runner 212 described above. In other embodiments, such functionality may be performed by program instructions independent of unit 330 (or even task runner 212). In some embodiments, such functionality may also be performed by firmware and/or dedicated hardware.

Figure 11:
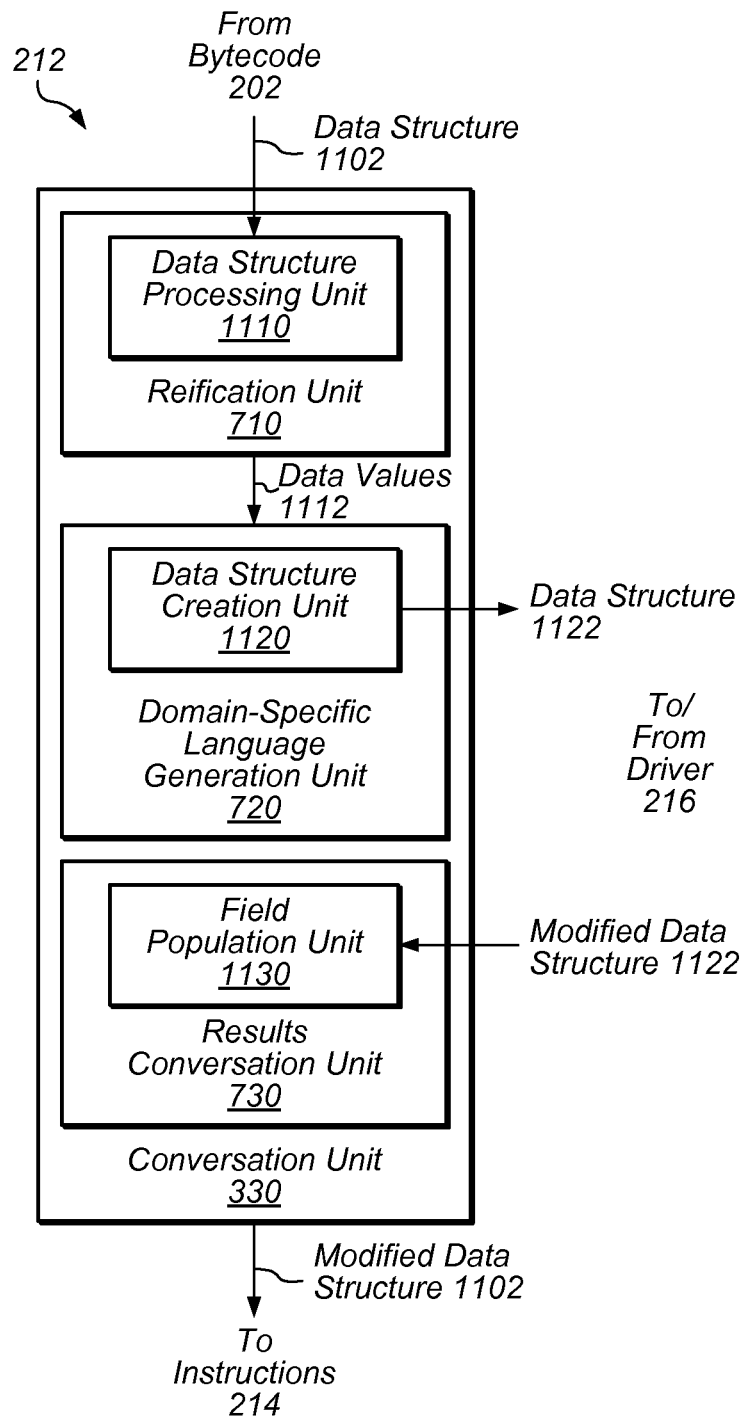
FIG. 11 is a block diagram illustrating one embodiment of a conversion unit executable to rearrange the layout of data in memory for workload distribution.

Turning now to FIG. 11, a block diagram of one embodiment of conversion unit 330 is depicted. As discussed above, in one embodiment, conversion unit 330 is executable to generate a set of domain-specific instructions (e.g., OPENCL instructions) for execution of offloaded tasks 204 on processor 220. Conversion unit 330 may also process results produced from performing tasks 204 including converting the results into a format suitable for use by instructions 214 executing on processor 210. To this end, conversion unit 330 may include a reification unit 710, domain-specific language generation unit 720, and a results conversation unit 730. In the illustrated embodiment, units 710-730 further include data structure processing unit 1110, data structure creation unit 1120, and field population unit 1130, respectively. Note that units 1110, 1120, and 1130 are exemplary; in various embodiments instructions may be grouped differently.

Data structure processing unit 1110, in one embodiment, is executable to identify data structures 1102 specified by bytecode 202 and determine whether structures 1102 have layouts suitable for parallelization and offloading. In various embodiments, processing unit 1110 may parse bytecode 202 to identify data structures 1102 and determine layout information about those structures. In some embodiments, this parsing process may include reifying bytecode into an intermediate form such as described above with reification unit 710. In various embodiments, processing unit 1110 may use this intermediate form to identify layout information about specified data structures and to determine whether particular structures 1102 have unsuitable layouts for offloading. In some embodiments, processing unit 1110 may determine that a data structure (such as data structure 110 described above) has an unsuitable layout if it stores data non-contiguously, uses pointers, includes non-primitive datatypes, etc. As will be described below, if processing unit 1110 determines that a particular data structure 1102 has an unsuitable layout, processing unit 1110, in some embodiments, may extract data values 1112 from data structure fields and provide the data values 1112 to unit 1120 for creation of a new data structure 1122 that stores the data in a more suitable form. (In other embodiments, processing unit 1110 may merely identify the fields storing data values 1112 to unit 1120, which handles extraction of the values 1112.)

In some embodiments, processing unit 1110 may extract (or identify) only the data values 1112 that are determined to be relevant to the performance of a set of tasks 204 (as opposed to extracting all data values specified by a data structure 1102). For example, processing unit 1110 may extract only data values 126A2, 126B2, 126D2, and 126E2 from data structure 110 if it determines that values 126A1-E1 and 126C2 are not relevant to the performance of a particular set of tasks 204. In some embodiments, extracting only the relevant data values 1112 may permit the non-relevant data values to continue to be operated on by instructions 214 (as noted above, in various embodiment, instructions 214 are instructions executable by processor 210 and may be produced by interpreting bytecode 204; in some instances, instructions 214 may produce data used by offloaded tasks 204 and operate on results produced by offloaded tasks 204) while the offloaded tasks 204 are being performed. Data structure processing unit 1110 is described in further detail below in conjunction with FIG. 13.

Data structure creation unit 1120, in one embodiment, is executable to create a data structure 1122 for storing extracted data values 1112 in a manner suitable for data-parallel execution (such as data structure 130 described above). In various embodiments, creation unit 1120 may create a data structure 1122 by requesting an allocation of memory locations and populating the allocated memory locations with the extracted data values 1112. In one embodiment, the requested allocation of memory locations is a contiguous block of memory to store an array of data values 1112. In various embodiments, creation unit 1120 may pass an address of the data structure 1122 to driver 216 to cause the data structure 1122 to be provided to processor 220 for the performance of a set of tasks 204. In one embodiment, creation unit 1120 may further prevent a garbage collector (e.g., of control program 213 described above) from reallocating memory locations of a data structure 1122 while processor 220 is performing a set of tasks 204. In various embodiments, operation of creation unit 1120 may be performed in conjunction with the generation of domain-specific instructions performed by domain-specific language generation unit 720 described above. Data structure creation unit 1120 is described in further detail below in conjunction with FIG. 13.

Field population unit 1130, in one embodiment, is executable to process data structure 1122 after performance of a set of tasks 204. In various embodiments, population unit 1130 may extract data values 1112 modified during performance of the tasks 204 and repopulate fields in a data structure 1102 with the extracted values 1112. For example, field population unit 1130 may extract modified data values 126A2, 126B2, 126D2, and 126E2 from data structure 130 and repopulate the fields in objects 124A, 124B, 124D, and 124E after performance of a set of tasks 204. In various embodiments, operation of population unit 1130 may be performed in conjunction with the conversion of other results performed by results conversion unit 730 described above. Field population unit 1130 is described in further detail below in conjunction with FIG. 14.

Figure 12:
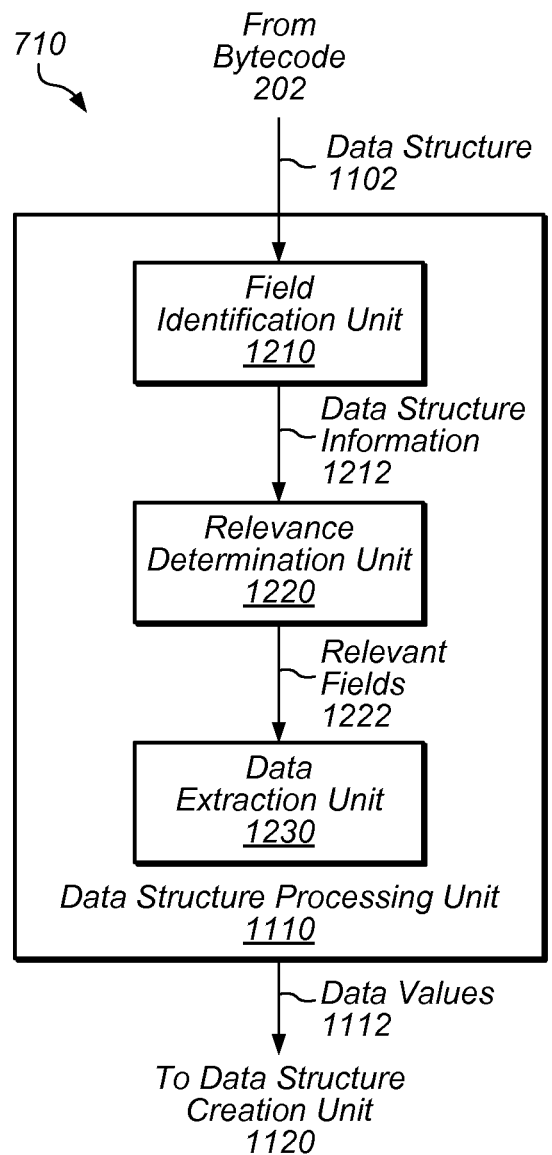
FIG. 12 is a block diagram illustrating one embodiment of a data structure processing unit of the conversion unit.

Turning now to FIG. 12, a block diagram of data structure processing unit 1110 is depicted. As discussed above, in one embodiment, processing unit 1110 identifies data structures 1102 specified by bytecode 202 and determines whether they have layouts suitable for parallelization and offloading. In the illustrated embodiment, processing unit 1110 includes field identification unit 1210, relevance unit 1220, and data extraction unit 1230.

Field identification unit 1210, in one embodiment, is executable to identify specified data structures 1102 and determine layout information about those structures 1102. In various embodiments, field identification unit 1210 may parse bytecode 202 for variable declarations and constant declarations. In one embodiment, field identification unit 1210 may focus specifically on parsing the constant_pool and fields portions of Java .class files. In one embodiment, field identification unit 1210 may insert information about data structures 1102 (such as information about the fields included within those structures) into an expression tree (such as described in conjunction with FIG. 7). Field identification unit 1210 may use this collected information to identified structures 1102 that have unsuitable layouts. In some embodiments, this information may also be used to select appropriate corresponding data structures supported by the domain specific language. In the illustrated embodiment, field identification unit 1210 provides information collected during the parsing to relevance determination unit 1222 as data structure information 1212.

Relevance determination unit 1220, in one embodiment, is executable to determine whether particular data included within a data structure 1102 is relevant to the performance of a set of tasks 204. As noted above, a data structure 1102 may include fields that store data values, which are not relevant to the performance of a set of tasks 204. In various embodiments, determination unit 1220 may determine the relevance of data values identifying whether they are referenced by methods called during performance of the tasks 204. Such methods may include methods that return data values from fields (also commonly referred to as "accessors" or "getters") and methods that modify data values in fields (also commonly referred to as "modifiers" or "setters"). In some embodiments, determination unit 1220 may parse the method portions of JAVA .class files to identify methods such as setters and getters. If a data value stored in a field is modified or accessed by such a method, determination unit 1220 may indicate that the field stores a relevant data value that may need to be included within the new data structure 1122. In the illustrated embodiment, determination unit 1220 may provide an indication of relevant fields 1222 to data extraction unit 1230.

Data extraction unit 1230, in one embodiment, is executable to extract data values 1112 stored in relevant fields of a data structure 1102. (As noted above, in some embodiments, unit 1230 may be included within creation unit 1120 instead of unit 1110.) In some embodiments, data extraction unit 1230 may extract a data value 1112 by calling the getter for that value 1112. In other embodiments, data extraction unit 1230 may determine the memory location for the field and retrieve the data value 1112 directly. In some embodiments, field population unit 1130 may use multiple threads to extract the data values in parallel. In the illustrated embodiment, extracted data values 1112 are provided to data structure creation unit 1120 described next.

Figure 13:
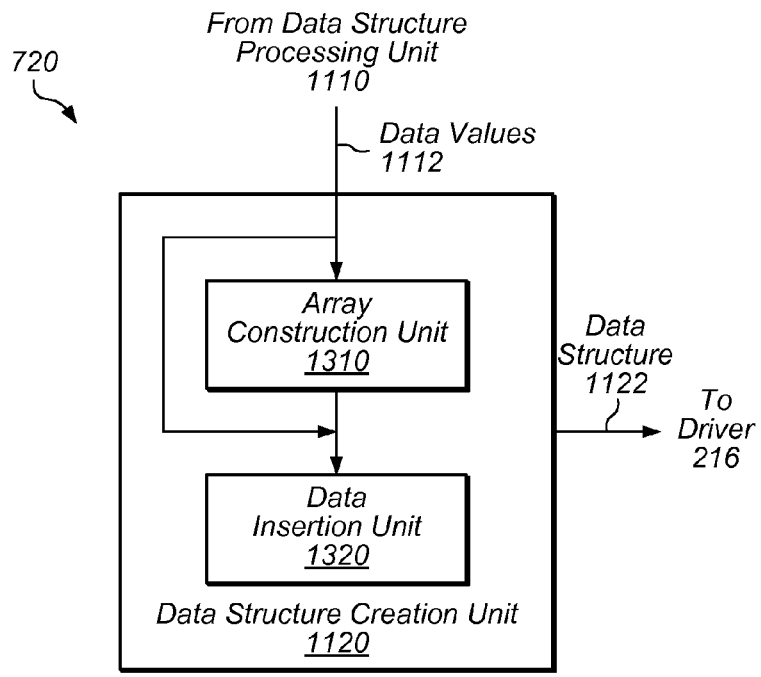
FIG. 13 is a block diagram illustrating one embodiment of a data structure creation unit of the conversion unit.

Turning now to FIG. 13, a block diagram of data structure creation unit 1120 is depicted. As discussed above, in one embodiment, creation unit 1120 creates a data structure 1122 that stores data values 1112 in manner suitable for parallelization and offloading. In the illustrated embodiment, creation unit 1120 includes array construction unit 1310 and data insertion unit 1320.

Array construction unit 1310, in one embodiment, is executable to request an allocation of memory locations for a new data structure 1122 (such as data structure 130) to store extracted data values. As noted above, in various embodiments, the requested allocation may be for an array that is able to store data values contiguously in memory. In various embodiments, the size of requested allocation may be determined based on information collected by unit 1110 such as described above. In some embodiments, array construction unit 1310 may request an allocation by invoking a memory allocation operator of control program 213 (as discussed above, in one embodiment, control program 213 is executable to manage execution of task runner 212 and/or bytecode 202; in some embodiments, control program 213 may further include an interpreter for producing instructions 214 from bytecode 202). For example, in one embodiment, array construction unit 1310 may invoke the "new" operator in JAVA to receive an allocation of memory. In some embodiments, array construction unit 1310 may also prevent a garbage collection unit from reallocating memory locations of data structure 1122 and/or data structure 1102 during performance of the set of tasks 204.

Data insertion unit 1320, in one embodiment, is executable to insert extracted data values 1112 into the fields of the created data structure 1122. In some embodiments, insertion unit 1320 may spawn multiple threads, which each handle the insertion of one or more data values 1112 in parallel to improve performance.

In the illustrated embodiment, creation unit 1120 provides a data structure 1122 to driver 216 to cause the structure 1122 to be distributed to one or more processors 220. In one embodiment, creation unit 1120 may pass an address of the data structure 1122 to identify the memory locations of the structure 1122 to driver 216. In some embodiments, driver 216, in turn, may provide the address to a processor 220, which then operates on data values 1112 stored in the data structure. In other embodiments, driver 216 may cause the data structure 1122 (or portions of structure 1122) to be copied into a memory of a processor 220 for performance of a set of tasks 204.

Figure 14:
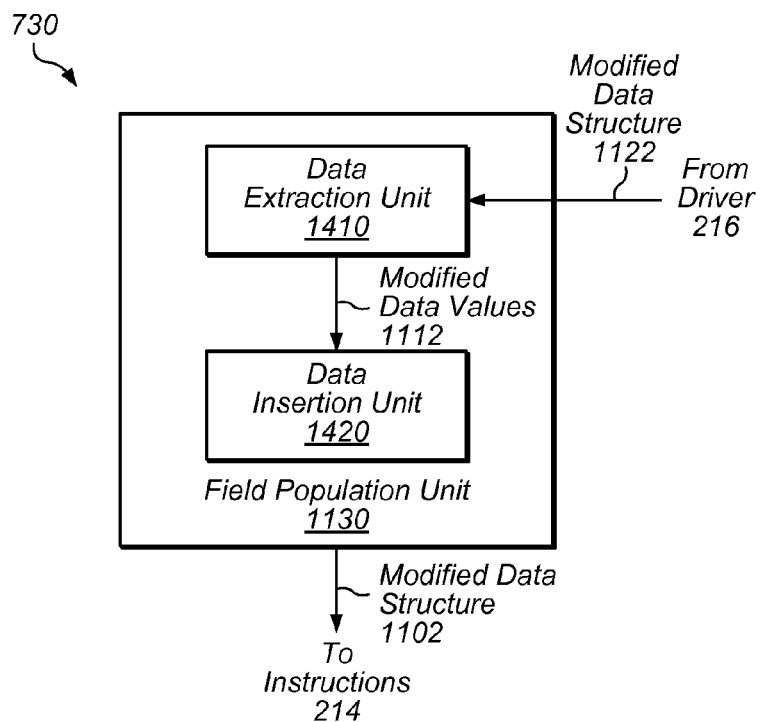
FIG. 14 is a block diagram illustrating one embodiment of an entry population unit of the conversion unit.

Turning now to FIG. 14, a block diagram of field population unit 1130 is depicted. As discussed above, in one embodiment, field population unit 1130 processes a data structure 1122 after performance of a set of tasks 204. In the illustrated embodiment, field population unit 1130 includes data extraction unit 1410 and data insertion unit 1420.

Data extraction unit 1410, in one embodiment, is executable to extract data values 1122 modified during the performance of a set of tasks 204 from a data structure 1122. In some embodiments, extraction unit 1410 may spawn multiple threads to extract modified data values 1112. In the illustrated embodiment, extraction unit 1410 provides the data values 1112 to data insertion unit 1420.

Data insertion unit 1420, in one embodiment, is executable to insert modified data values 1112 back into a data structure 1102. In some embodiments, data insertion unit 1420 may insert a data value 1112 by calling the setter for that value 1112. In other embodiments, data extraction unit 1420 may determine the memory location for the field and insert the data value 1112 directly. In some embodiments, insertion unit 1420 may use multiple threads to insert data values 1112 in parallel.

Figure 15:
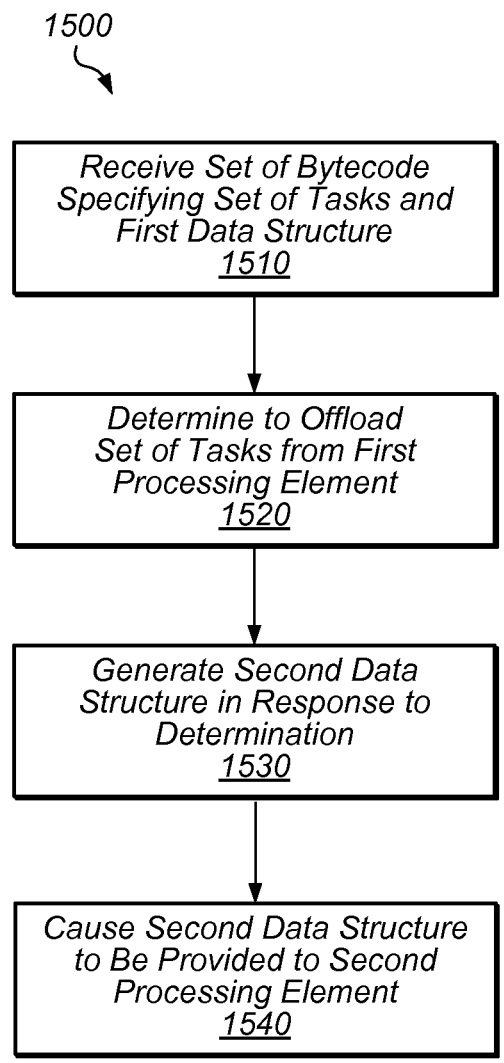
FIG. 15 is a flow diagram illustrating one embodiment of a method for transforming the layout of data in memory for workload distribution.

Turning now to FIG. 15, a flow diagram of a method 1500 for transforming a layout of data for workload distribution is depicted. Method 1500 is one embodiment of a method that may be performed by a processor element (such as processor 210) executing program instructions (such as instructions of conversion unit 330 included in task runner 212). In some embodiments, the program instructions may be interpretable by a control program (such as control program 213) on the first processing element to produce instructions within an instruction set architecture (ISA) of the first processing element. As discussed above, in some embodiments, the control program is further executable to implement a virtual machine. In many instances, performance of method 1500 can permit performance of tasks to be parallelized and offloaded even though their performance is dependent on data stored in an unsuitable manner in memory such as being stored non-contiguously. In some embodiments, method 1500 may be performed in conjunction with methods 800 or 900 described above.

In step 1510, processor 210 receives a set of bytecode (e.g., bytecode 202). In various embodiments, the bytecode specifies a set of tasks (e.g., tasks 204) and a first data structure (e.g., data structure 1102) that specifies data to be operated on during performance of the set of tasks. In some embodiments, the bytecode was developed using an object-oriented programming language and an API that allows a developer to represent a data parallel problem. As discussed above, the first data structure may be stored non-contiguously in memory of the computer system. For example, in one embodiment, the first data structure may include an array of pointers to the data such as data structure 110.

In step 1520, processor 210 determines to offload the set of tasks to a second processing element (e.g., processor 220) of the computer system (e.g., computing platform 10). In some embodiments, step 1520 may be performed in a similar manner as steps 820 and/or 920 described above. As discussed above, in one embodiment, this determination may be based on an analysis of one or more JAVA .class files and identifying whether one or more criteria have been satisfied.

In step 1530, processor 210 generates a second data structure that specifies the data for performance of the tasks 204 being offloaded. As discussed above, in various embodiments, the second data structure is stored contiguously in memory of the computer system. In one embodiment, the second data structure is an array of data values such as data structure 130 described above. In various embodiments, step 1530 includes extracting the data from the first data structure, requesting an allocation of contiguous memory locations for the second data structure, and inserting the extracted data into the contiguous memory locations for the second data structure. In some embodiments, processor 210 extracts the data by reifying the set of bytecode to produce an intermediary representation of the set of bytecode and using the intermediary representation to identify data to be extracted from the first data structure. As discussed above, in one embodiment, step 1530 may include creating a plurality of threads and using the plurality of threads to extract the data from the first data structure. In various embodiments, the first data structure may specify other data that is unrelated to the performance of the offloaded tasks, and step 1530 may include processor 210 determining whether data specified by the first data structure is relevant to the performance of the offloaded tasks.

In some embodiments, step 1530 may further include processor 210 generating of a set of domain-specific instructions from the set of bytecode in response to determining to offload the set of tasks to processor 220 such as performed in steps 830 and 840 or step 930 described above. These domain-specific instructions may specify operations to be performed on data values inserted into the second data structure.

In step 1540, processor 210 causes the second data structure to be provided to processor 220 for performance of the set of tasks. In various embodiments, an address of the second data structure is provided to a driver associated with processor 220 (e.g., driver 216). In some embodiments, processor 220 may access the data values at the provided address. In other embodiments, the second data structure (or data values within the second data structure) may be copied to a memory of processor 220 before processor 220 operates on the data values during performance of the offloaded tasks. In some embodiments, step 1540 further includes providing a set of domain-specific instructions generated in step 1530 to the driver, which (as described above) may be executable to generate a set of instructions for processor 220 to perform the set of tasks using the data in the second data structure.

In various embodiments, method 1500 may further include processor 210 receiving a set of results from processor 220 for performance of the set of tasks and processor 210 updating data specified by the first data structure based on the received set of results. In some embodiments, processor 210 may update data by extracting data values from the second data structure and reinserting the data values into first data structure. In one embodiment, data values may be reinserted into the first data structure by calling setters associated with fields in the data structure. In various embodiments, reinserted data values may be subsequently operated on by instructions (e.g. instructions 214) executing on processor 210.

Figure 16:
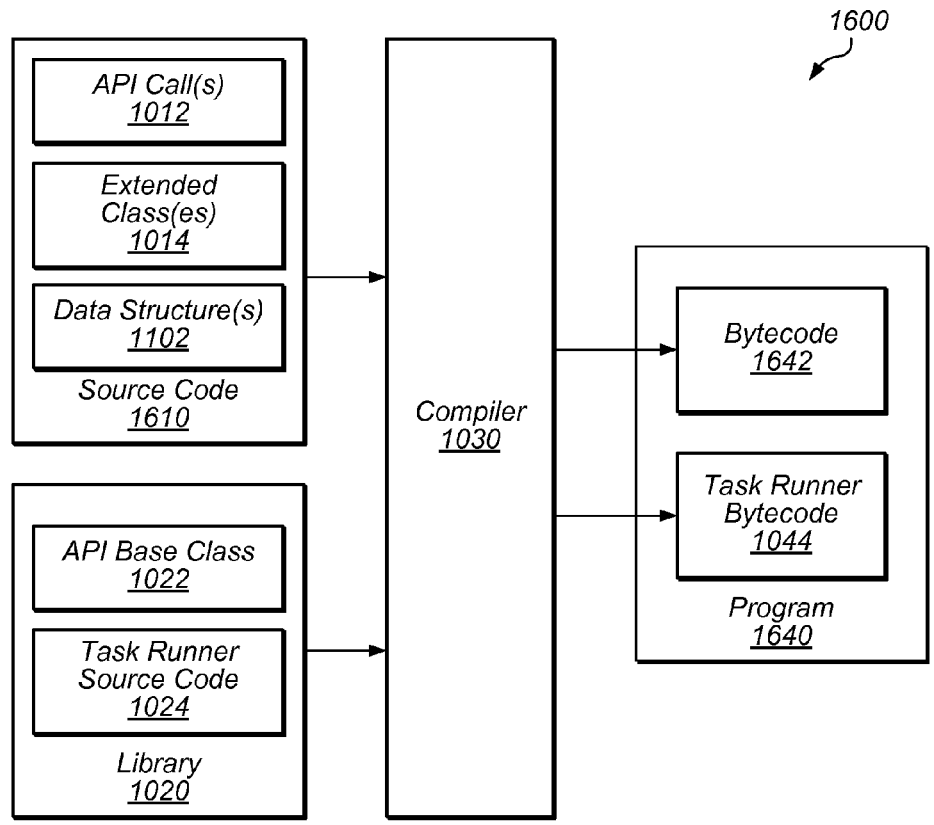
FIG. 16 is a block diagram illustrating another embodiment of an exemplary compilation of program instructions.

Turning now to FIG. 16, another embodiment of an exemplary compilation 1600 of program instructions is depicted. In the illustrated embodiment, compiler 1030 complies sources code 1610 and library 1020 to produce program 1040. In various embodiments, compilation 1600 may be performed in a similar manner as compilation 1000 described in conjunction with FIG. 10. As discussed above, compilation 1600 may include compiling additional pieces of source code and/or library source code; in some embodiments, compilation 1600 may be performed differently depending upon the program language being used.

Source code 1610, in one embodiment, is source code written by a developer to perform a data parallel problem. As discussed with source code 1010, source code 1610 may include one or more API calls 1012 to library 1020 to specify one or more sets of tasks for parallelization. In one embodiment, an API call 1012 specifies an extended class 1014 of an API base class 1022 defined within library 1020 to represent the data parallel problem. Source code 1010 may be written in any of a variety of languages, such as the object-oriented languages described above. In the illustrated embodiment, source code 1610 further includes code for the creation of one or more data structures 1102. This source code may include class declarations for defining class fields and methods, variable declarations for allocating memory, constructor calls for initializing values, etc.

As will be described with reference to FIG. 18, source code 1610 and its compiled form program 1640 may be included on one or more computer-readable media.

One example of source code 1610, which may be compiled by compiler 1030, is presented below. In this example, the source code defines a class Foo having fields a and b and creates a corresponding array of Foo objects called myObjs[ ]. The source code then specifies a set of tasks to be performed on data values in fields a and b of the Foo objects.

To create the class Foo, the source code may include the following class declaration:

```
class Foo {
    int a;
    boolean b;
    public int getA( ) {return a};
    public void setB(boolean x) {b=x};
}
```

As shown, this code includes variable declarations for an integer field a and a boolean field b. The code also includes method declarations for a getter method associated with the integer field and a setter method associated with the boolean field.

The source code may also include the class declaration for OopyTask, which specifies a set of operations to be performed using data values in fields a and b.

```
class OopyTask extends Task{
    Foo myObjs[ ];
    public OopyTask( Foo[ ] f) {
        myObjs = f;
    }
    run( ) {
        int id = getGlobalId( ); // the global id
        if( myObjs[id].getA( ) < 2 ) {
            myObjs[id].setB(false);
        }
    }
}
```

The class OopyTask includes a variable declaration for an array of pointers to Foo objects myObjs[ ] and a constructor to initialize the array. The class also extends the base class "Task" and overrides the routine run ( ). In this example, run checks whether the field a of a particular instance of a Foo object (Foo.a) is greater than 2. If this is the case, the data value false is stored in the instance's field b (Foo.b).

Note that the classes Foo and OopyTask are written in an object-oriented style using the generally accepted practice of using getters and setters on object fields. The data structure myObjs[ ] (which has a similar layout to data structure 110 described above) is also a more complicated data structure traditional of objected-oriented programming.

To perform the tasks specified by the class OopyTask, task runner 212 (e.g., using conversion unit 330) may produce a corresponding set of domain-specific instructions for the tasks and create a corresponding data structure for data values in myObjs[ ]. For example, in one embodiment, task runner 212 may create an array of values for field a and another array of values for field b. In another embodiment, task runner 212 may create an array of structs stored contiguously in memory, such as my fooObjArray described below.

The struct Foo_s for fooObjArray may be defined by the generated domain-specific instructions as follows:

```
struct Foo_s {
    int a;
    boolean b;
} Foo;
```

As discussed above, task runner 212 may request a memory allocation for fooObjArray and begin extracting needed data values from myObjs[ ] for insertion into fooObjArray. In various embodiments, this extraction process may include analyzing getter and setters, object members, etc. Task runner 212 may then provide the following domain-specific instructions to driver for performance of the tasks:

```
typedef struct Foo_s{
    int a;
    boolean b;
}Foo;
typedef struct This_s{
    __global Foo *fooObjArray;
}This;
__task void run(__global Foo *fooObjArray){
    This thisStruct;
    This* this=&thisStruct;
    this-> fooObjArray = fooObjArray;
    {
        int myId = get__global__id(0);
        if (this-> fooObjArray[myId].a < 2) {
            this-> fooObjArray[myId].b = false;
        }
        return;
```

```
    }
}
```

As shown, this code defines a C-style array of structs fooObjArray, which is contiguously allocated and may be transferred to the memory on which the data parallel application operates. The code then specifies of a corresponding run( ) method for the performance of the tasks.

After the tasks have been performed, task runner 212 may extract the values from the array of structs fooObjArray and replaces the a and b values in each Foo object in the input array myObjs.

Exemplary Computer System

Figure 17:
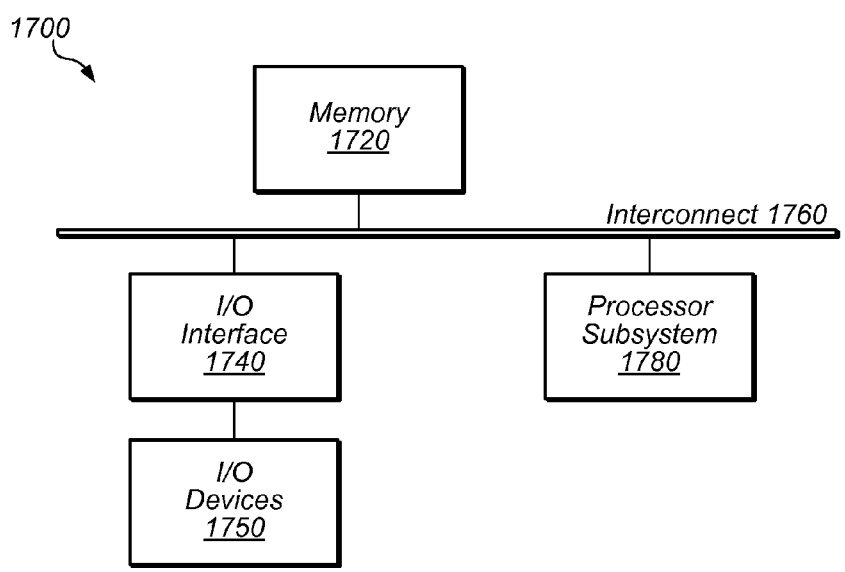
FIG. 17 is a block diagram illustrating one embodiment of an exemplary computer system.

Turning now to FIG. 17, one embodiment of an exemplary computer system 1700, which may implement platform 10, is depicted. Computer system 1700 includes a processor subsystem 1780 that is coupled to a system memory 1720 and I/O interfaces(s) 1740 via an interconnect 1760 (e.g., a system bus). I/O interface(s) 1740 is coupled to one or more I/O devices 1750. Computer system 1700 may be any of various types of devices, including, but not limited to, a server system, personal computer system, desktop computer, laptop or notebook computer, mainframe computer system, handheld computer, workstation, network computer, a consumer device such as a mobile phone, pager, or personal data assistant (PDA). Computer system 1700 may also be any type of networked peripheral device such as storage devices, switches, modems, routers, etc. Although a single computer system 1700 is shown in FIG. 17 for convenience, system 1700 may also be implemented as two or more computer systems operating together.

Processor subsystem 1780 may include one or more processors or processing units. In various embodiments of computer system 1700, multiple instances of processor subsystem 1780 may be coupled to interconnect 1760. In various embodiments, processor subsystem 1780 (or each processor unit within 1780) may contain a cache or other form of on-board memory. In one embodiment, processor subsystem 1780 may include processor 210 and processor 220 described above.

System memory 1720 is usable by processor subsystem 1780. System memory 1720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1700 is not limited to primary storage such as memory 1720. Rather, computer system 1700 may also include other forms of storage such as cache memory in processor subsystem 1780 and secondary storage on I/O Devices 1750 (e.g., a hard drive, storage array, etc.). In some embodiments, these other forms of storage may also store program instructions executable by processor subsystem 1780. In some embodiments, memory 200 described above may include (or be included within) system memory 1720.

I/O interfaces 1740 may be any of various types of interfaces configured to couple to and communicate with other devices, according to various embodiments. In one embodiment, I/O interface 1740 is a bridge chip (e.g., Southbridge) from a front-side to one or more back-side buses. I/O interfaces 1740 may be coupled to one or more I/O devices 1750 via one or more corresponding buses or other interfaces. Examples of I/O devices include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1700 is coupled to a network via a network interface device.

Exemplary Computer-Readable Storage Media

Figure 18:
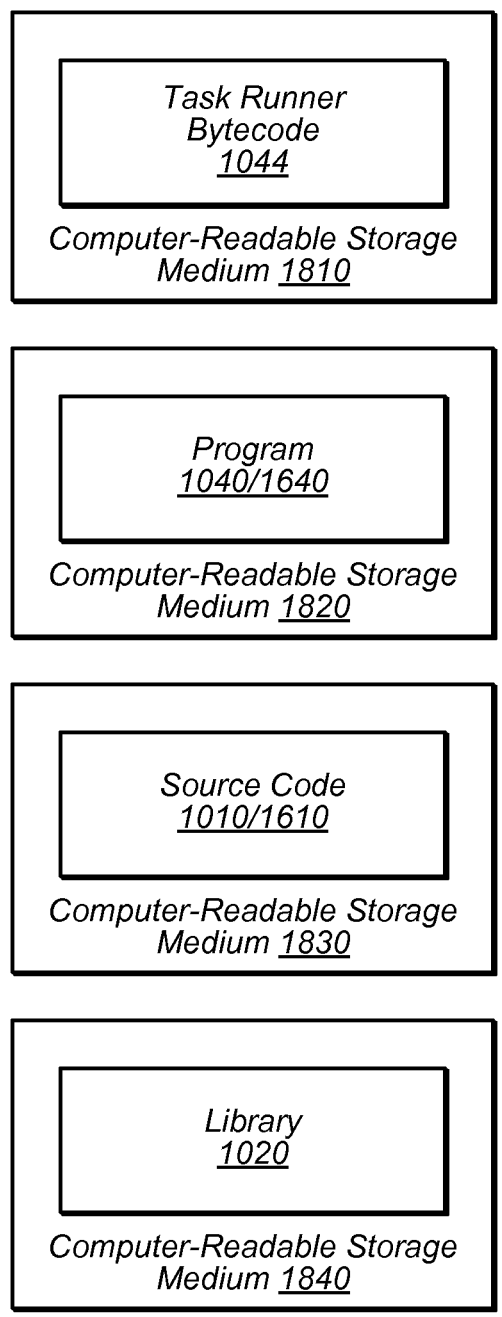
FIG. 18 is a block diagram illustrating embodiments of exemplary computer-readable storage media.

Turning now to FIG. 18, embodiments of exemplary computer readable storage media 1810-1840 are depicted. Computer-readable storage media 1800-1840 are embodiments of an article of manufacture that stores instructions that are executable by platform 10 (or interpretable by control program 213 executing on platform 10). As shown, computer-readable storage medium 1810 includes task runner bytecode 1044. Computer-readable storage medium 1820 includes program 1040/1640. Computer-readable storage medium 1830 includes source code 1010/1610. Computer-readable storage medium 1840 includes library 1020. FIG. 18 is not intended to limit the scope of possible computer-readable storage media that may be used in accordance with platform 10, but rather to illustrate exemplary contents of such media. In short, computer-readable media may store any of a variety of program instructions and/or data to perform operations described herein.

Computer-readable storage media 1810-1840 refer to any of a variety of tangible (i.e., non-transitory) media that store program instructions and/or data used during execution. In one embodiment, ones of computer-storage readable media 1800-1840 may include various portions of the memory subsystem 1710. In other embodiments, ones of computer-readable storage media 1800-1840 may include storage media or memory media of a peripheral storage device 1720 such as magnetic (e.g., disk) or optical media (e.g., CD, DVD, and related technologies, etc.). Computer-readable storage media 1810-1840 may be either volatile or nonvolatile memory. For example, ones of computer-readable storage media 1810-1840 may be (without limitation) FB-DIMM, DDR/DDR2/DDR3/DDR4 SDRAM, RDRAM®, flash memory, and of various types of ROM, etc. Note: as used herein, a computer-readable storage medium is not used to connote only a transitory medium such as a carrier wave, but rather refers to some non-transitory medium such as those enumerated above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer readable medium having program instructions stored thereon that are executable on a first processing element of a computer system to perform:
   receiving a set of bytecode and a first data structure, wherein the set of bytecode specifies a set of tasks, and wherein the first data structure includes data to be operated on during performance of the set of tasks;
   reifying the set of bytecode to produce an intermediary form of the set of bytecode;
   determining whether to offload the set of tasks to a second processing element of the computer system;
   in response to determining to offload the set of tasks, determining whether the first data structure includes data stored contiguously or non-contiguously in memory of the computer system;
   in response to determining that the data in the first data structure is stored non-contiguously:
      identifying, using the intermediate form, data values associated with fields of the first data structure;
      extracting the data values from the first data structure; and
      generating a second data structure that includes the extracted data values, wherein the second data structure is an array of the data values and is stored contiguously in the memory of the computer system; and
   providing the second data structure to the second processing element for performance of the set of tasks.

2. The computer readable medium of claim 1, wherein the first data structure includes an array of pointers to the included data.

3. The computer readable medium of claim 1, wherein generating the second data structure includes:
   requesting an allocation of contiguous memory locations for the second data structure; and
   inserting the identified data values into the contiguous memory locations for the second data structure.

4. The computer readable medium of claim 1, wherein the program instructions are further executable to create a plurality of threads, and to use the plurality of threads to extract the identified data values from the first data structure.

5. The computer readable medium of claim 1, wherein the program instructions are further executable to perform:
   in response to determining to offload the set of tasks to the second processing element, generating a set of domain-specific instructions from the set of bytecode, wherein the set of domain-specific instructions have a domain-specific language format and specify layout information for the second data structure; and
   providing the set of domain-specific instructions to a driver executable to generate a set of instructions for the second processing element to perform the set of tasks using the data.

6. The computer readable medium of claim 1, wherein the first data structure includes other data that is unrelated to the performance of the offloaded tasks, and wherein the program instructions are further executable to determine whether data included in the first data structure is relevant to the performance of the offloaded tasks.

7. The computer readable medium of claim 1, wherein the program instructions are further executable to perform:
   receiving a set of results from the second processing element for performance of the set of tasks; and
   updating data included in the first data structure based on the received set of results.

8. The computer readable medium of claim 1, wherein the program instructions are further executable to prevent a garbage collector from reallocating memory locations used by the first and second data structures while the set of tasks are being performed by the second processing element.

9. The computer readable medium of claim 1, wherein the program instructions are interpretable by a control program on the first processing element to produce instructions within an instruction set architecture (ISA) of the first processing element, and wherein the control program is executable to implement a virtual machine.

10. The computer readable medium of claim 1, wherein the second processing element is a graphics processor.

11. A method, comprising:
- a first processing element receiving a set of instructions specifying a data parallel problem and a first data structure having a set of data values to be operated on during performance of the data parallel problem;
- reifying the set of instructions to produce an intermediary form of the instructions;
- determining that the set of data values of the first data structure is stored non-contiguously in a memory of a computer system;
- in response to the determining and determining to offload the data parallel problem to a second processing element, the first processing element generating a second data structure having the set of data values, wherein the second data structure is an array stored contiguously in the memory, and wherein the generating includes:
  - using the intermediary form to identify data values in the first data structure; and
  - extracting the identified data values to include in the second data structure; and
- the first processing element providing the second data structure to the second processing element for performance of the data parallel problem.

12. The method of claim 11, wherein the providing includes providing an address of the set of data values to a driver associated with the second processing element.

13. The method of claim 11, further comprising:
- the first processing element executing an interpreter to interpret at least a portion of the set of instructions.

14. The method of claim 11, wherein the first and second processing elements are separate cores with in a processor.

15. A non-transitory computer readable medium, comprising:
- source program instructions of a library routine that are compilable by a compiler for inclusion in compiled code as a compiled library routine;
- wherein the compiled library routine is executable on a first processing element of a computer system to perform:
  - receiving a first set of bytecode, wherein the first set of bytecode specifies a set of tasks and a first data structure that specifies data to be operated on during performance of the set of tasks;
  - reifying the first set of bytecode to produce an intermediary form of the first set of bytecode;
  - determining that the data specified by the first data structure is stored non-contiguously in memory of the computer system;
  - in response to the determining and determining to offload the set of tasks to a second processing element of the computer system, generating a second data structure that includes the data, wherein the second data structure is stored contiguously in memory of the computer system, and wherein the generating includes:
    - analyzing the intermediary form to identify data values included in fields of the first data structure;
    - extracting the data values from the fields; and
    - including the extracted data values in the second data structure; and
  - providing the second data structure to the second processing element for performance of the set of tasks.

16. The computer readable medium of claim 15, wherein the compiled library routine is interpretable by a virtual machine for the first processing element, wherein the virtual machine is executable to interpret compiled instructions to produce instructions within an instruction set architecture (ISA) of the first processing element.

17. The computer readable medium of claim 15, wherein the first set of bytecode specifies the set of tasks by extending a base class defined in the library routine, and wherein the extend class specifies the first data structure.

* * * * *